US00RE47941E

(19) United States
(12) Reissued Patent
Ragner

(10) Patent Number: US RE47,941 E
(45) Date of Reissued Patent: Apr. 14, 2020

(54) ERGONOMIC BINDING SYSTEM FOR LARGE FORMAT IMAGES

(71) Applicant: Ragner Technology Corporation, Gainesville, FL (US)

(72) Inventor: Gary Dean Ragner, Gainesville, FL (US)

(73) Assignee: Ragner Technology Corporation, Gainesville, FL (US)

(21) Appl. No.: 15/897,762

(22) Filed: Feb. 15, 2018

Related U.S. Patent Documents

Reissue of:
(64) Patent No.: 9,259,955
Issued: Feb. 16, 2016
Appl. No.: 13/707,587
Filed: Dec. 6, 2012

U.S. Applications:
(60) Provisional application No. 61/567,274, filed on Dec. 6, 2011.

(51) Int. Cl.

| | |
|---|---|
| ***B42C 9/00*** | (2006.01) |
| ***B42D 1/00*** | (2006.01) |
| ***G09B 29/04*** | (2006.01) |
| ***B42D 15/00*** | (2006.01) |

(52) U.S. Cl.
CPC ..... *B42C 9/00* (2013.01); *B42D 1/00* (2013.01); *B42D 15/008* (2013.01); *G09B 29/04* (2013.01)

(58) Field of Classification Search
None
See application file for complete search history.

(56) References Cited

U.S. PATENT DOCUMENTS

| | | | | |
|---|---|---|---|---|
| 1,531,065 | A * | 3/1925 | Boyer | 283/34 |
| 2,118,964 | A | 5/1938 | Bonnaire | |
| 2,190,438 | A | 2/1940 | Vogt | |
| 2,572,460 | A | 10/1951 | Falk | |
| 2,615,732 | A | 10/1952 | Falk | |
| 3,143,363 | A | 8/1964 | Falk | |
| 3,248,806 | A | 5/1966 | Schrader | |

(Continued)

FOREIGN PATENT DOCUMENTS

| | | | |
|---|---|---|---|
| DE | 2435775 | * | 6/1976 |
| DE | 9014038 | * | 8/1992 |

(Continued)

OTHER PUBLICATIONS

Marion County (2010) http://2.bp.blogspot.com/_lv-jmqfn_KE/TCsFlo7yhWI/AAAAAAAAAIM/xUm6N5zo-gw/s1600/county_selection.png.*

*Primary Examiner* — Glenn K Dawson
(74) *Attorney, Agent, or Firm* — Vorys, Sater, Seymour and Pease LLP

(57) ABSTRACT

A binding system (30H) having separate page images (81), (82), and (84) each of which present a portion of a complete map or image. The page images are printed within binding system (30H) which comprises three or more main pages (80a), (80b), and (80c) bonded to a main spine (21), and one or more secondary pages (86a) mounted on secondary spine (23a). Main spine (21) and secondary spine (23a) are substantially perpendicular to each other and bisect each other. Thereby allowing pages to be turned both vertically and horizontally without significantly altering the binding systems overall dimensions when open.

19 Claims, 22 Drawing Sheets

(56) References Cited

U.S. PATENT DOCUMENTS

Figure 1:
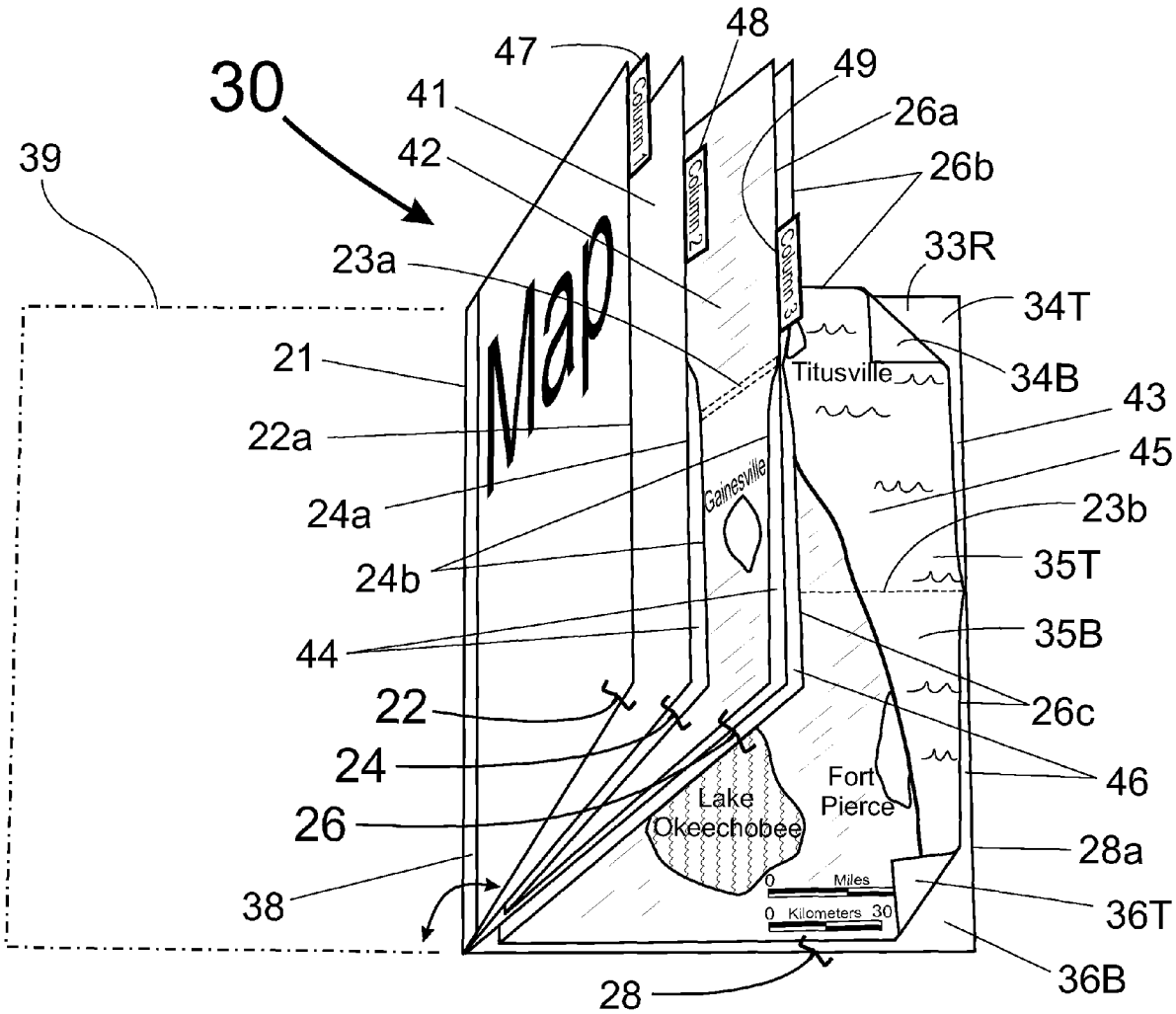

| | | | | | |
|---|---|---|---|---|---|
| 3,560,025 | A | * | 2/1971 | Ostrander | B42F 5/00 229/68.1 |
| 4,270,773 | A | | 6/1981 | Gaetano | |
| 4,289,333 | A | | 9/1981 | Gaetano | |
| 4,801,157 | A | * | 1/1989 | Sink | 283/35 |
| 4,906,024 | A | | 3/1990 | Lein | |
| 5,358,278 | A | * | 10/1994 | Ellis | B42D 15/0053 281/29 |
| 6,189,933 | B1 | | 2/2001 | Felderman | |
| 6,276,723 | B1 | | 8/2001 | Willard | |
| 6,354,985 | B2 | | 3/2002 | Huber | |
| 6,629,800 | B1 | | 10/2003 | Brown | |
| 2002/0125712 | A1 | | 9/2002 | Felderman | |

FOREIGN PATENT DOCUMENTS

| | | | |
|---|---|---|---|
| DE | 19828033 | * | 2/2000 |
| WO | WO 9405509 | * | 3/1994 |

* cited by examiner

ERGONOMIC BINDING SYSTEM FOR LARGE FORMAT IMAGES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This utility application claims priority from U.S. Provisional Application Ser. No. 61/567,274, filed on Dec. 6, 2011, titled: "Ergonomic Binding System For Large Format Images".

BACKGROUND

1. Field of Invention

The field of this invention relates to sheet binding methods such as for a book or booklet and more specifically to binding methods that comprise both horizontal and vertical spines.

2. Prior Art

Several attempts have been made to improve the use of large format images, such as maps and blueprints without requiring a large table to lay them out on. The prior art seems to fall into two general categories: 1) [a] special ways of folding a regular sized map, and 2) a book form that uses special ways of folding out the pages for easy viewing.

Under the first category, U.S. Pat. No. 6,354,985 B2 to Huber, U.S. Pat. No. 6,189,933 B1 to Felderman, Publication No. US 2002/0125712 A1 to Felderman, U.S. Pat. No. 4,906,024 to Lein, U.S. Pat. No. 3,248,806 to Schrader, U.S. Pat. No. 3,143,363 to Falk, U.S. Pat. No. 2,615,732 to Falk, U.S. Pat. No. 2,572,460 to Falk, U.S. Pat. No. 2,118,964 to Bonnaire and U.S. Pat. No. 1,531,065 to Boyer all show different ways to fold a regular map for special uses.

Under the second category, U.S. Pat. No. 6,629,800 B1 to Brown, U.S. Pat. No. 4,289,333 to Gaetano, U.S. Pat. No. 4,270,773 to Gaetano, and U.S. Pat. No. 2,190,438 to L. E. Vogt, all show maps that are constructed in a book form where pages fold-out in a various ways.

U.S. Pat. No. 6,189,933 B1 to Felderman, and its Publication No. US 2002/0125712 A1, U.S. Pat. No. 3,248,806 to Schrader, U.S. Pat. No. 3,143,363 to Falk, U.S. Pat. No. 2,615,732 to Falk, and U.S. Pat. No. 1,531,065 to Boyer all show ways of folding a map, but also disclose folding the map into a book like format.

The Applicant's binding system teaches a single main spine that allows the binding system to be opened and closed like a book and multiple secondary spines that are perpendicular to the main spine. The disclosed binding system also teaches that each secondary spine can be folded at the main spine. The Applicant's binding system further teaches the advantages including overlap section on adjacent page images to allow the user to quickly identify their position on the new page image when turning a page in any direction.

SUMMARY

The large format image binding system disclosed here (here after referred to as Map Binding System, book structure, Binding System, System and Map) can be used to bind any large format image, such as, a map, a schematic drawing, a blueprint, a large photo, etc. The binding system allows a map or other large format image to be put into a book form and [allow] *allows* the user to flip through the image both vertically and horizontally. Because pages can be turned both horizontally and vertically, the user can follow roads on maps, circuit lines on schematic drawings, lines on a blueprint, and any other extended feature from page to page both horizontally and vertically.

The binding system comprises main pages bound by a main outer spine generally oriented either horizontally or vertically with respect to the image(s) it contains. One or more secondary pages are bonded to one or more secondary inner spines. Each secondary spine can comprise an elongated bond zone that extends across two directly adjacent main pages such that the secondary inner spine is substantially oriented perpendicular to the main outer spine. The secondary spine and secondary pages are designed to allow the secondary pages to be paged through perpendicular to the main pages and also to fold along a line at the outer spine. This allows the main pages to be turned whenever desired and also allowing the secondary pages between the presently opened main pages to be turned whenever desired.

DEFINITIONS

Spine—the term "spine" will be used here to refer to both "main spines" and "secondary Spines" and is generally defined herein as an elongated bonding zone where at least one sheet of printable material is bonded to at least one other sheet of printable material, in such a way, to allow the one sheet of printed material to be turned and/or folded near the elongated bonding zone to alternately expose the two printable sides of the one sheet of printable material.

Main Spine—(also "Main Outer Spine") is the outer spine of the disclosed large format image binding system and is where one end of the "Main Pages" are bonded adjacent each other to allow the user to flip through the "Main Pages" like a normal book page. An outer cover, if present, can also be bonded at the main spine. The main spine is what most people would call the spine of a book and/or magazine.

Bond Zone—(also "elongated bond zone" and "bond line") the elongated area where pages are bonded to define a spine. Where one or more secondary pages are bonded across two adjacent "main pages". Where main pages are bonded.

Main Page—the physical sheets of printable materials that are bonded at one edge to the "main spine". The main pages can comprise a single layer sheet bonded at one edge to the main spine, a folded sheet bonded to the main spine at the folded sheet's opened ends to form one main page, a folded sheet bonded to a main spine at the folded sheet's folded end to form two main pages, or a multi-layer sheet comprising two or more sheets bonded together across their surfaces and bonded at one edge to the main spine. Folding either of the above single-layer sheet or multi-layer sheet and bonding them to a main spine at the folded edge can form two main pages.

Secondary Spine—(also "Secondary Inner Spine", etc.) is the inner spine of the disclosed large format image binding system and is where the "secondary pages" are bonded at one edge. A secondary spine comprises an elongated bond zone that extends across two adjacent "main pages" and substantially perpendicular to the "main spine". The secondary spine can also fold across the Main Spine of the binding system.

Secondary Page—(also "secondary page sheet", etc.) the physical sheets of printable materials that are bonded at one edge to the "secondary spine". The secondary pages can comprise a single layer sheet bonded at one edge to a secondary spine, a single layer sheet bonded along an interior line on the sheet to form two secondary pages, or a multi-layer sheet comprising two or more sheets with their surfaces bonded together and bonded at one edge, or along an interior line, to a secondary spine. Folding either of the above single-layer sheet or multi-layer sheet and bonding them to a secondary spine at a folded edge can form two secondary pages.

Page View—the unique viewable surface that a page image is physically printed on and viewable when a particular combination of main pages and secondary pages are in a particular unique open position. For example, turning to a particular main page and then turning to a particular secondary page, opens the binding system to a unique viewable surface (page view) for the binding system at that main page position and secondary page position combination.

Page Image—the printed image on a particular unique page view.

Overlap Image—overlapped part of a Page Image at edge(s) or border(s) that is also printed on Page Images in adjacent Page Views.

OBJECTIVES AND ADVANTAGES

Accordingly, several objects and advantages of the invention are:

a) To provide a book and booklet binding system that provides both vertical and horizontal spines.

b) To provide a binding system or book structure that allows easy and intuitive navigation of large format images.

c) To provide a binding system or book structure for a large format image where the user may scan horizontally across a large format image by turning pages bound on a vertical spine, and scan vertically across the large format image by turning pages bound on one or more horizontal spines.

d) To provide a binding system or book structure for a large format image where the user may scan vertically across a large format image by turning pages bound on a horizontal spine, and scan horizontally across the large format image by turning pages bound on one or more vertical spines.

e) To provide a binding system or book structure that allows compact storage of large format images.

f) To provide a binding system or book structure that does not have the limitations of prior art folded maps in book form. Where the prior art maps are printed on one side of the print medium (i.e. paper) and then folded into a book. This results in each working page comprising two thicknesses of print medium. This doubles the thickness of the pages and thus limits the effective number of pages that can be folded together. The disclosed binding system uses substantially single thickness printable material for all its secondary pages.

g) To provide a binding system or book structure for maps where adjacent pages have overlapping image sections to make it easier for users to identify where they are on the map or large format image when turning from one page to another.

h) To provide a binding system or book structure for maps where adjacent page images have overlapping image sections for both horizontally and vertically adjacent pages. Where the overlapping images are back to back on a page edge or page group edge.

i) To provide a binding system or book structure for maps where adjacent page images have an overlapping image [sections] *section* common to three adjacent page images. Where the overlapping images are back to back on the page edges or page group edges.

j) To provide a binding system or book structure for maps where adjacent page images have an overlapping image sections common to four adjacent page images. Where the overlapping images are back to back on the page edges or page group edges.

k) To provide a binding system or book structure where main pages have tabs on them to allow the user to easily flip to that specific main page and view a specific column or row, depending on the orientation of the main spine.

l) To provide a binding system or book structure comprising a map guide on each viewable section of the map (page image), where the map guide graphically identifies which part of the full map the user is presently viewing.

m) To provide a binding system or book structure that allows printing on both sides of the pages which are bound at one edge to a main spine or a secondary [spines] *spine* depending on their location in the large format image.

n) To provide a binding system or book structure that allows the user to turn pages in both the vertical and horizontal direction, which allows the user to choose between turning pages in any of four directions from a single page view. Overlap sections on the edges of the page images allows the user to quickly re-locate their present location when turning a page. Additionally, each page image includes a map guide to graphically identify the present page image's location in relationship to the large format image.

o) To provide a binding system or book structure that uses an expansion notch in one or more main pages and/or secondary pages at the intersection of the main spine and the secondary spine to allow the pages to fold more easily when cross folded at the intersection of the main spine and a secondary spine.

p) To provide a binding system or book structure with an overlap image printed on both sides of a free edge of one or more main pages.

q) To provide a binding system or book structure with an overlap image printed on both sides of a free edge of one or more secondary pages.

r) To provide a binding system or book structure that includes selection tabs on the unbound edge of one or more of the main pages to assist the user in turning to the desired viewing column (main page group) of the book structure.

s) To provide a binding system or book structure with an overlap corner area where four separate page images share the same image of the overlap corner area.

t) To provide a binding system or book structure where one or more main pages comprise a folded sheet with one surface folded together and bonded to itself along that surface to form a multilayer main page.

u) To provide a binding system or book structure where one or more main pages comprise a folded sheet with one surface folded together and bonded to itself along that surface to form a multilayer main page. Wherein not all the surface that is folded together is bonded and a small portion along the edge nearest the main spine is not bonded to allow the main page to conform to secondary pages as the secondary pages are turned.

DRAWING FIGURES

FIG. 1 Example of the binding system used with a Florida map image.

Figure 1A:
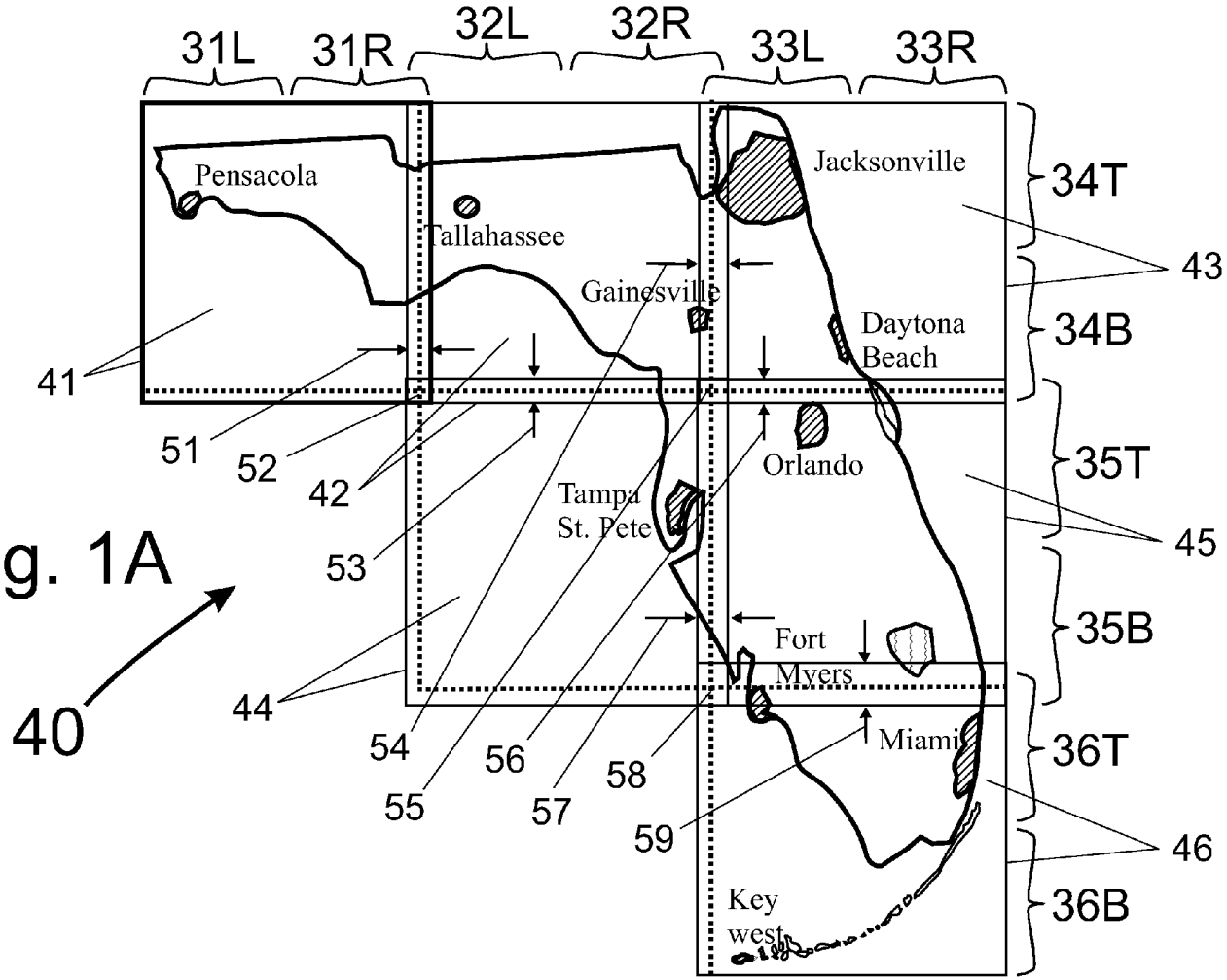

FIG. 1A Layout of Florida map image.

Figure 2A:
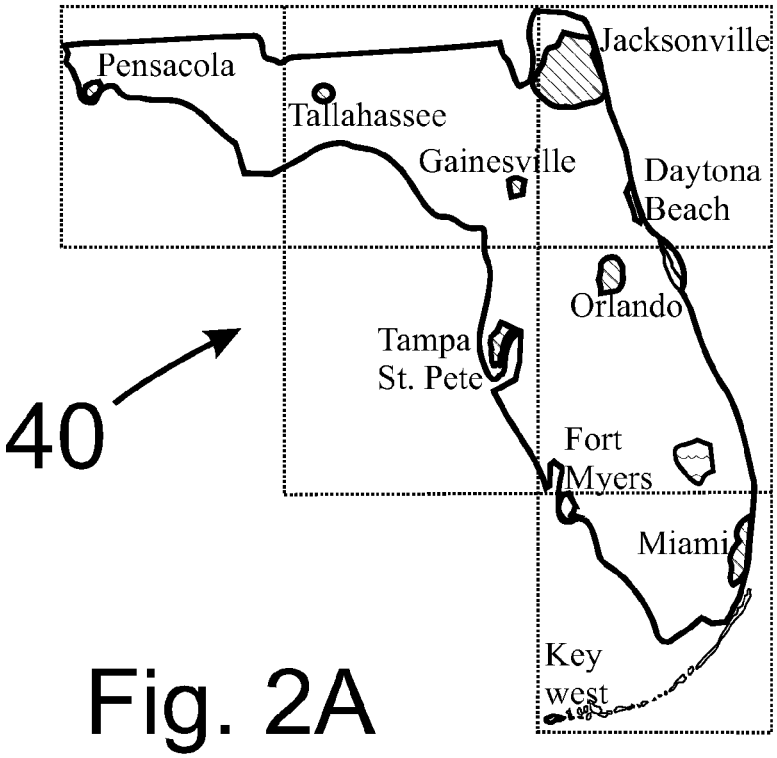

FIG. 2A Prior art Florida map with prior art method of dividing map into pages.

Figure 2B:
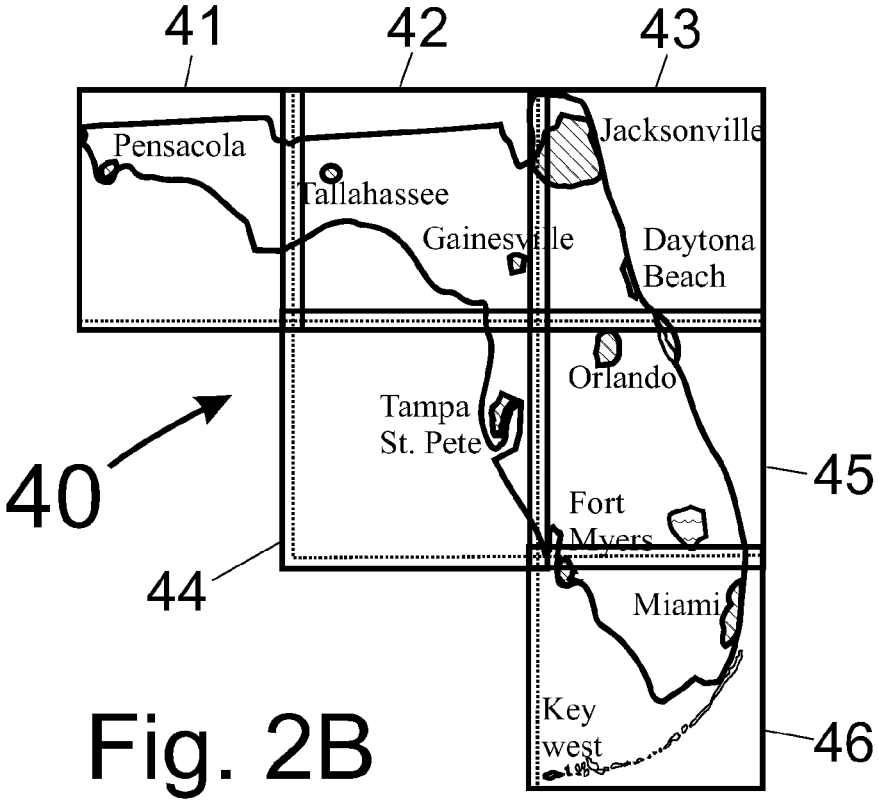

FIG. 2B Division pattern with overlaps of the Florida map image for the preferred binding system in FIG. 1.

Figure 2C:
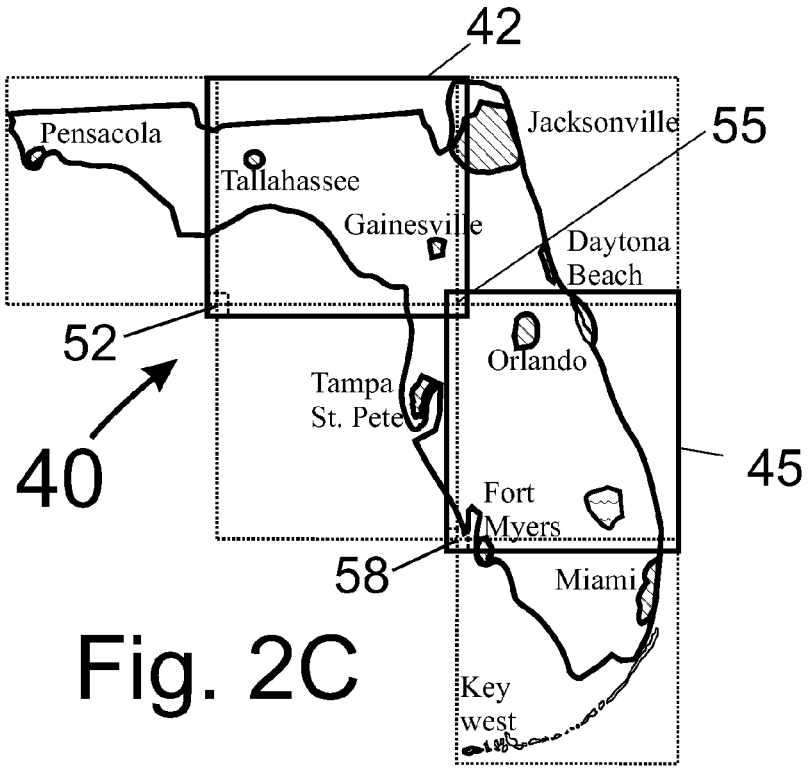

FIG. 2C Division pattern showing corner overlap image 53 of viewable page images 42 & 45.

Figure 2D:
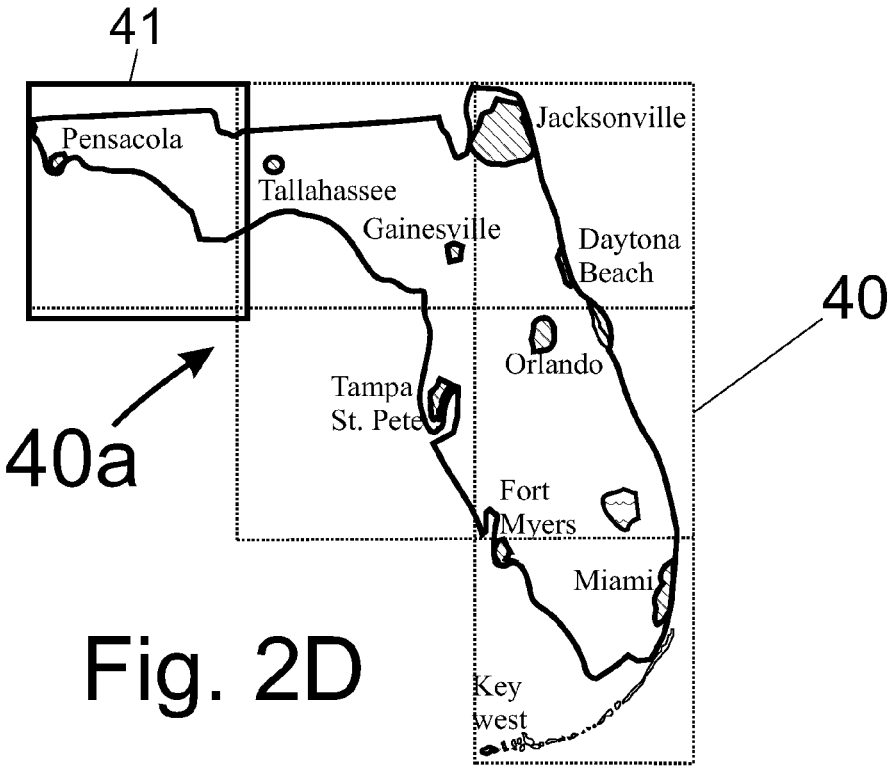

FIG. 2D Guide map 40a with viewable page image 41 marked with a thick line box.

Figure 2E:
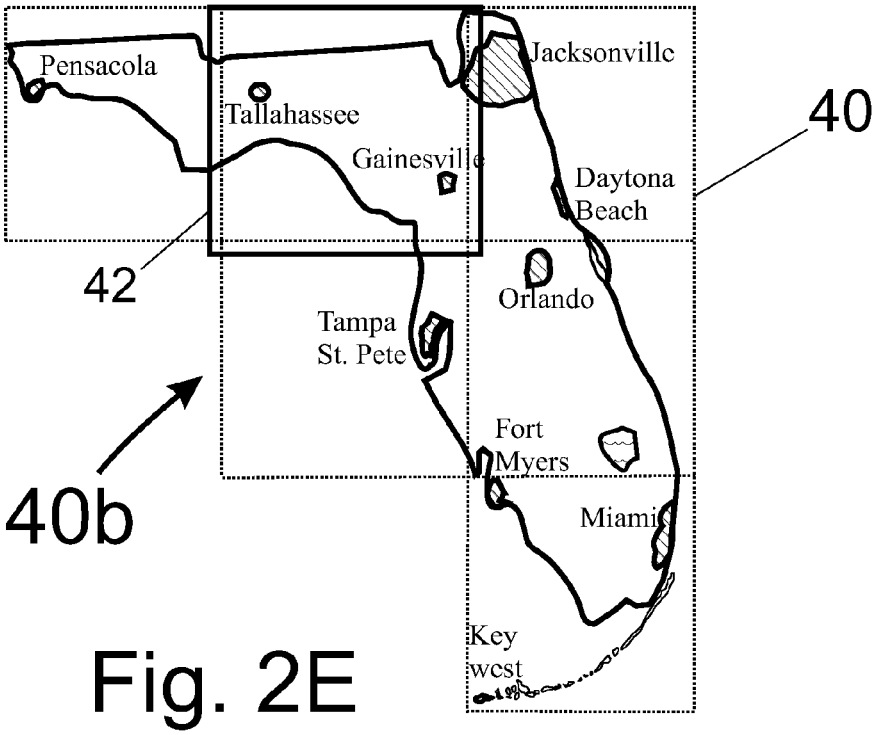

FIG. 2E Guide map 40b with viewable page image 42 marked with a thick line box.

Figure 2F:
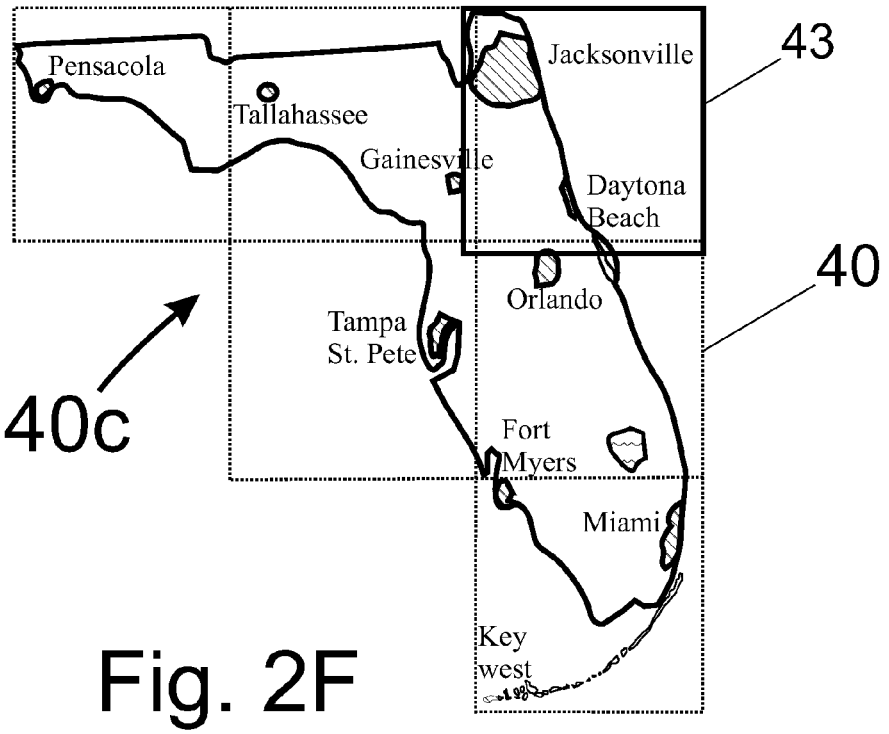

FIG. 2F Guide map 40c with viewable page image 43 marked with a thick line box.

Figure 2G:
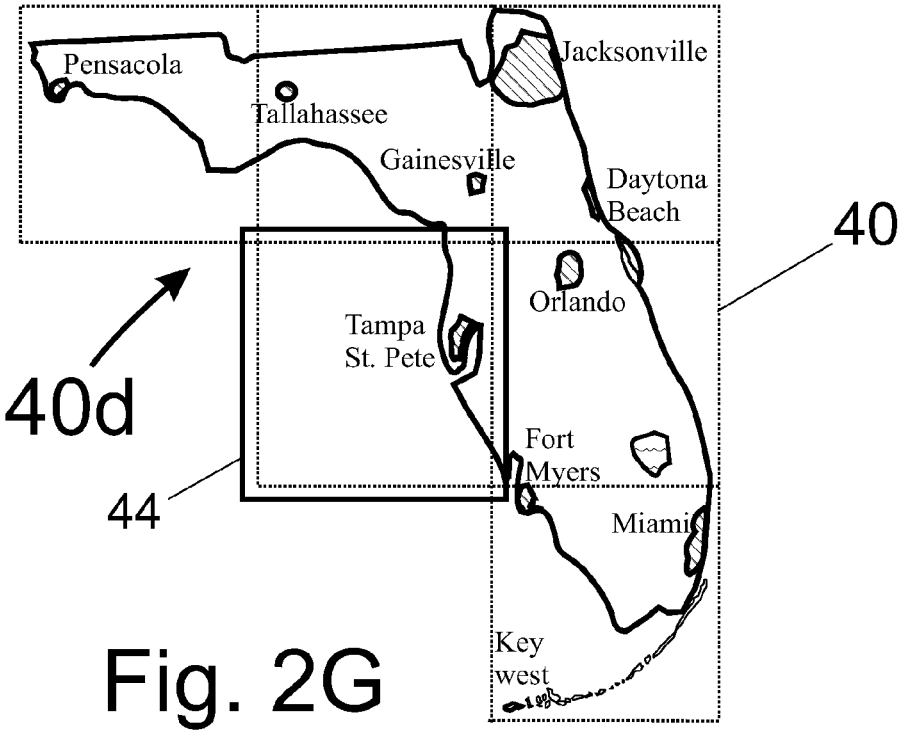

FIG. 2G Guide map 40d with viewable page image 44 marked with a thick line box.

Figure 2H:
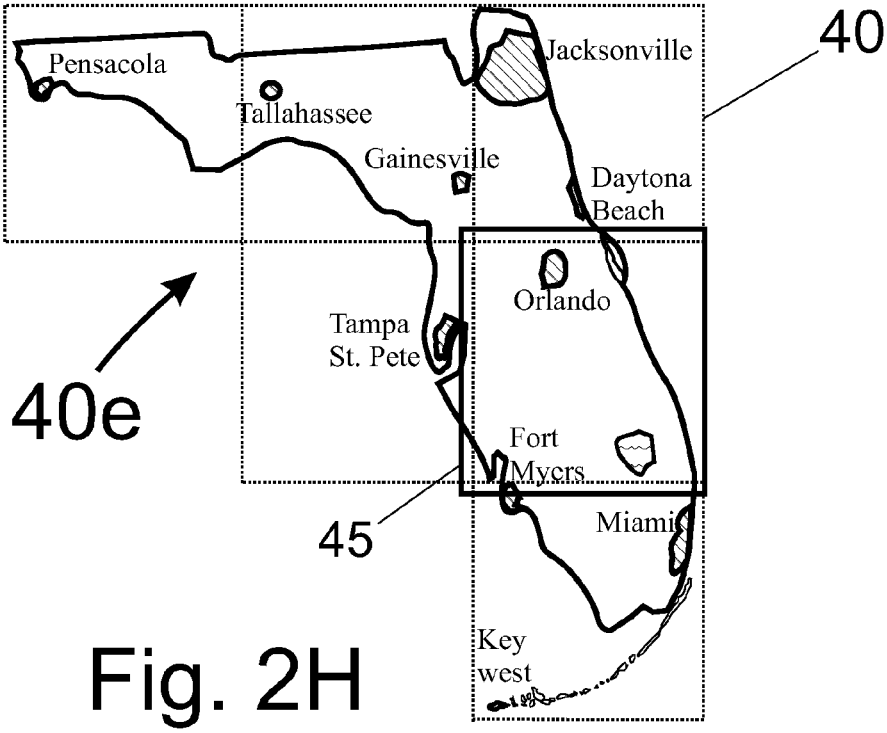

FIG. 2H Guide map 40e with viewable page image 45 marked with a thick line box.

Figure 2J:
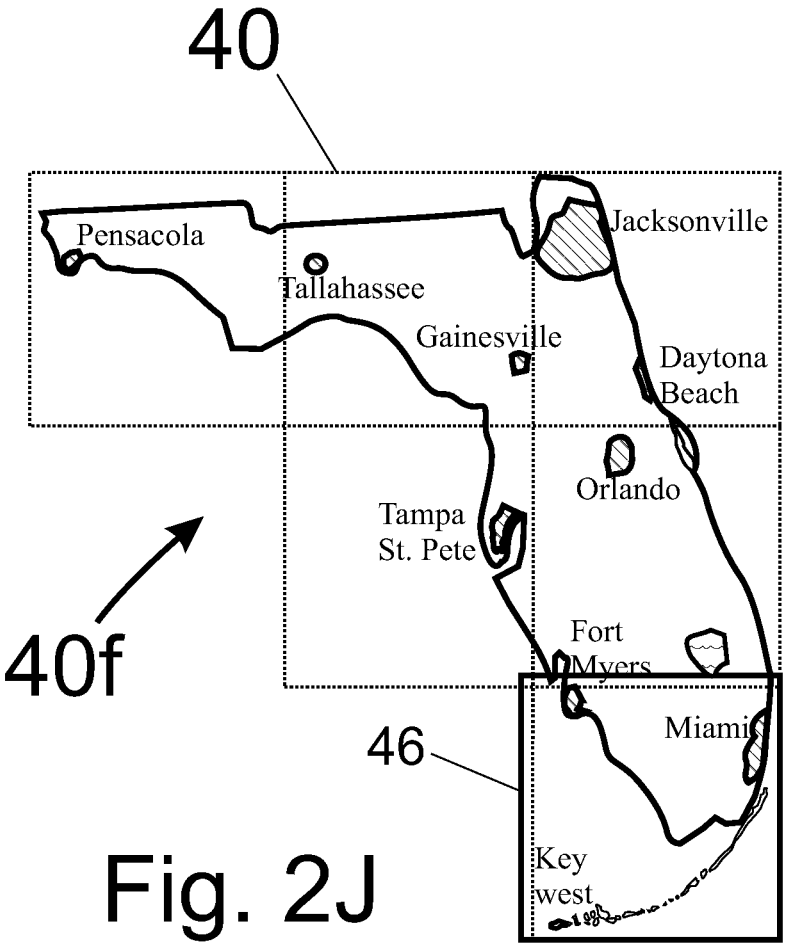

FIG. 2J Guide map 40f with viewable page image 46 marked with a thick line box.

Figure 3A:
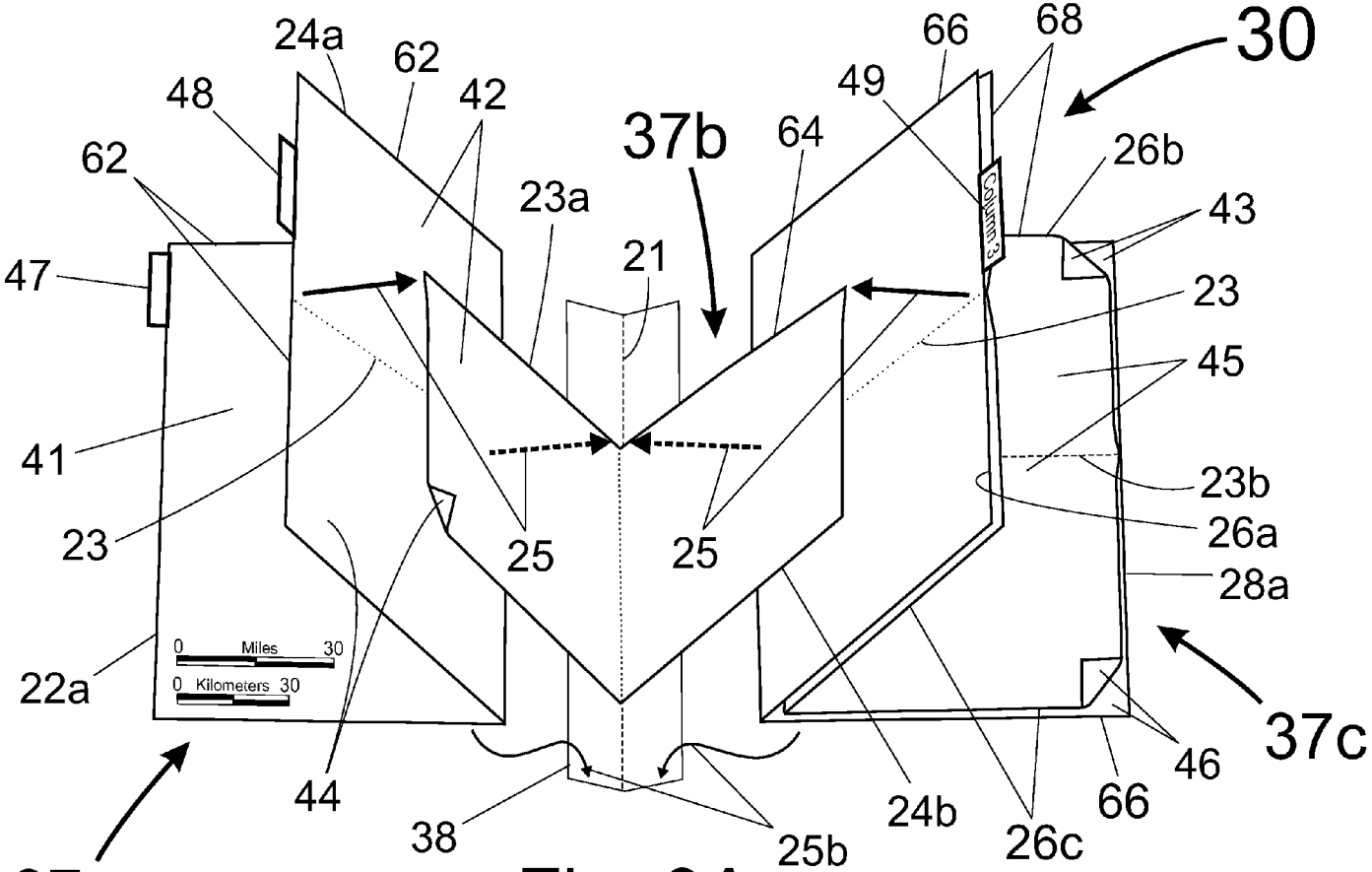

FIG. 3A Construction view of preferred binding system seen in FIG. 1.

Figure 3B:
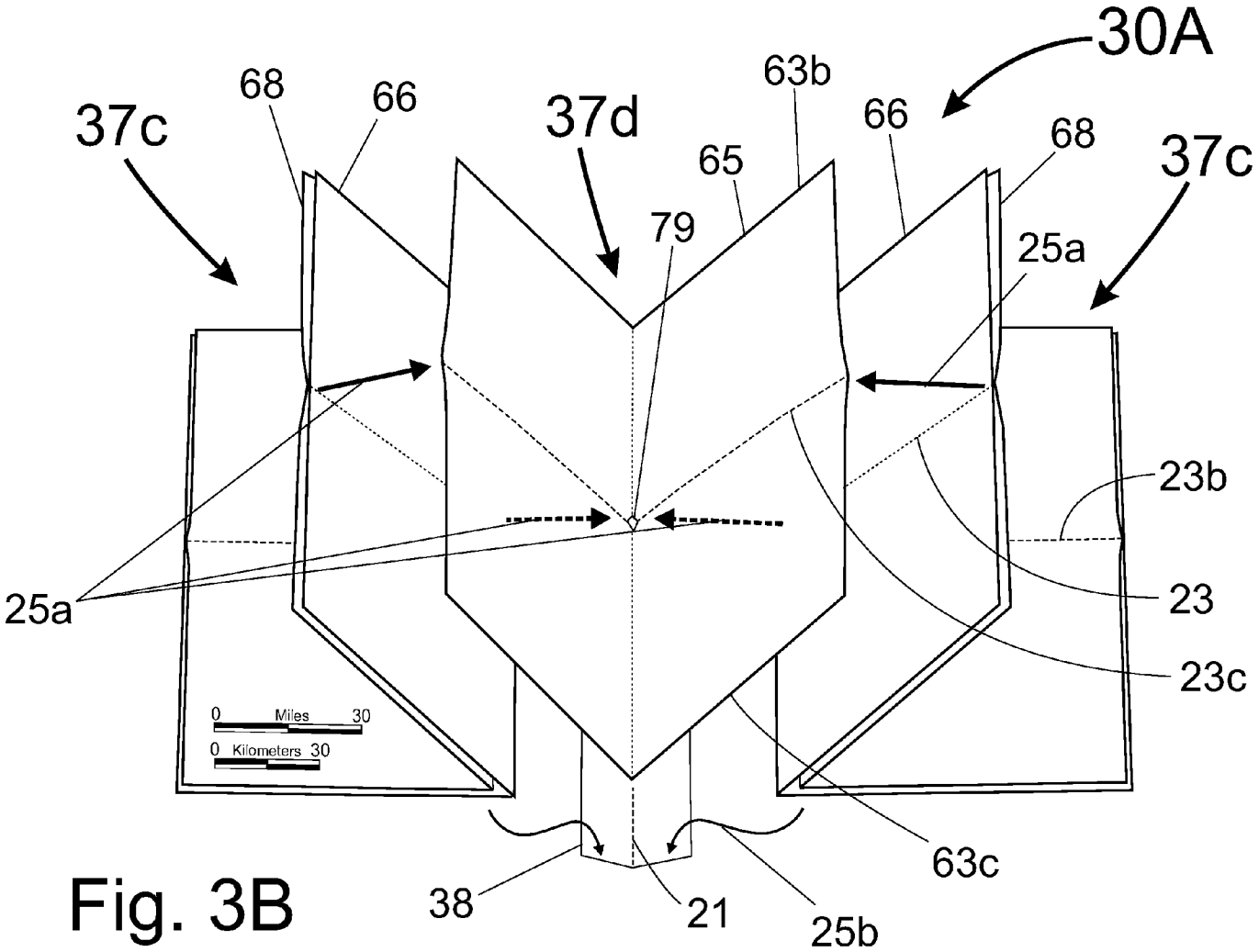

FIG. 3B A first alternative construction example for the disclosed binding system.

Figure 4A:
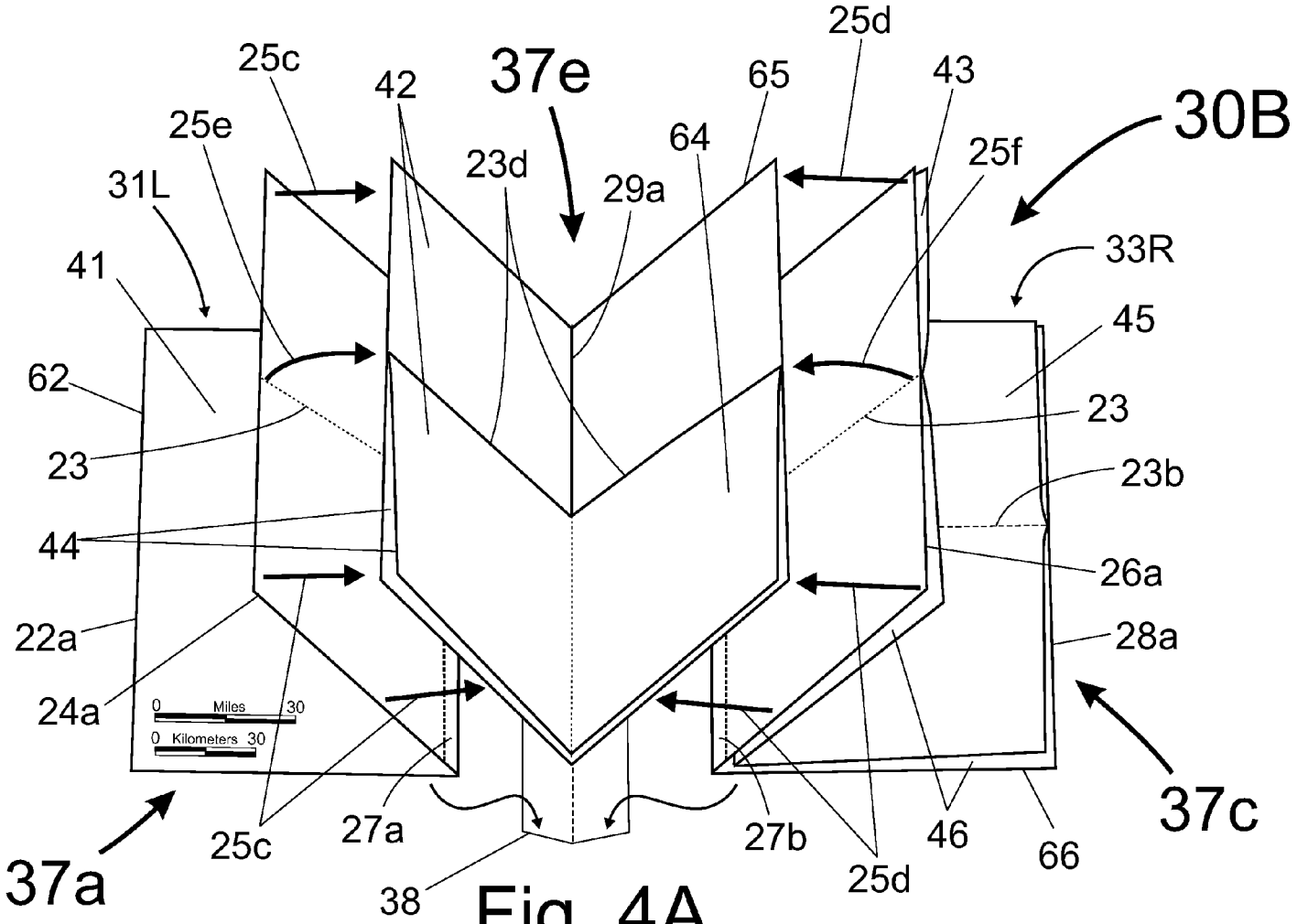

FIG. 4A A second alternative construction example for disclosed binding system.

Figure 4B:
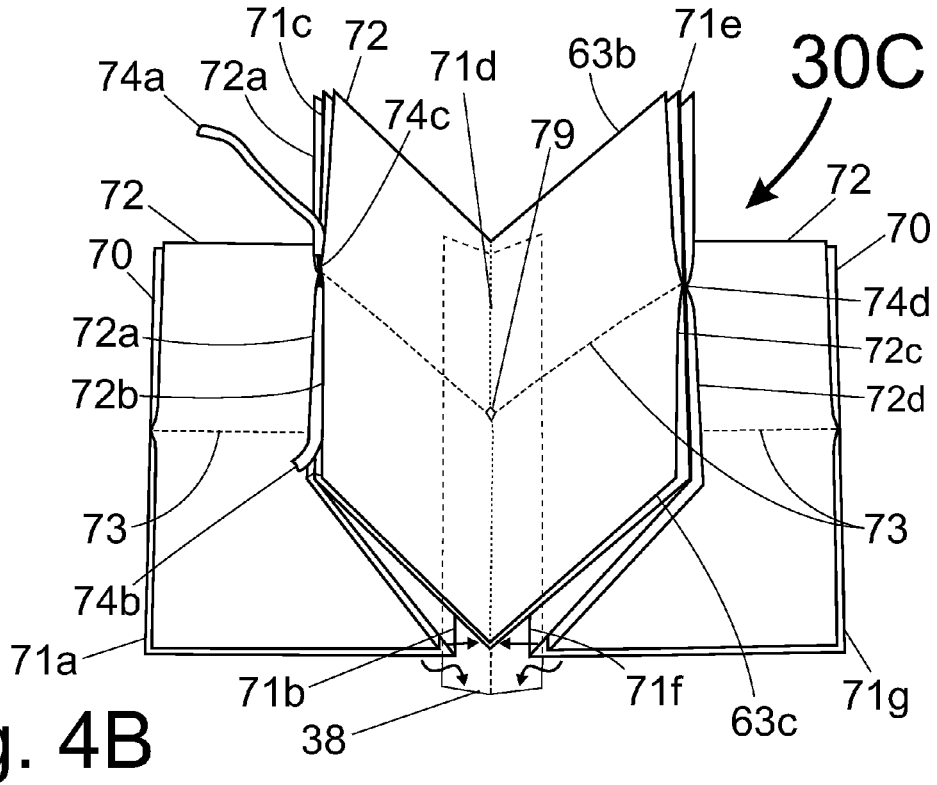

FIG. 4B A third alternative construction example for the disclosed binding system.

Figure 4C:
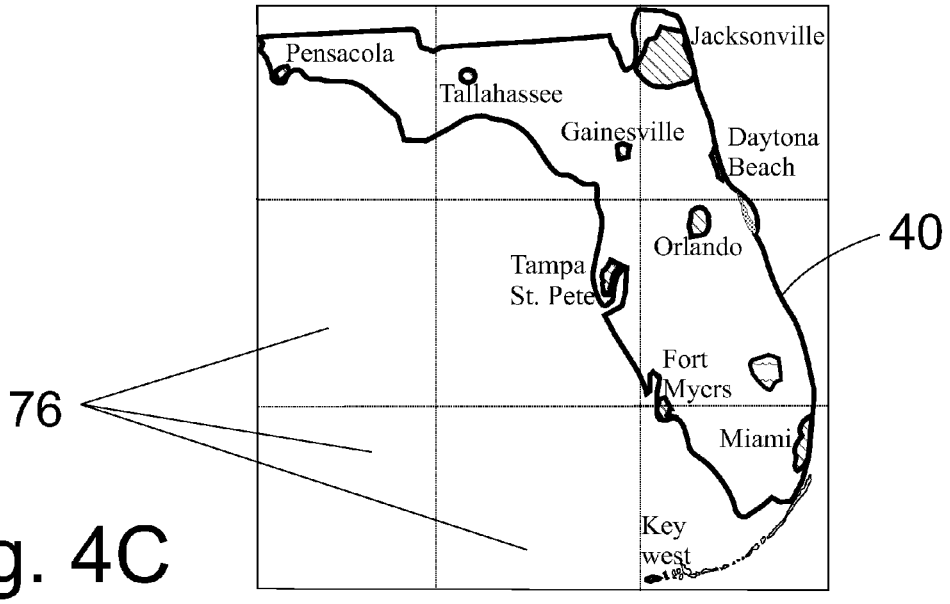

FIG. 4C Map image 40 with 3×3 grid for book structures 30A and 30C.

Figure 5A:
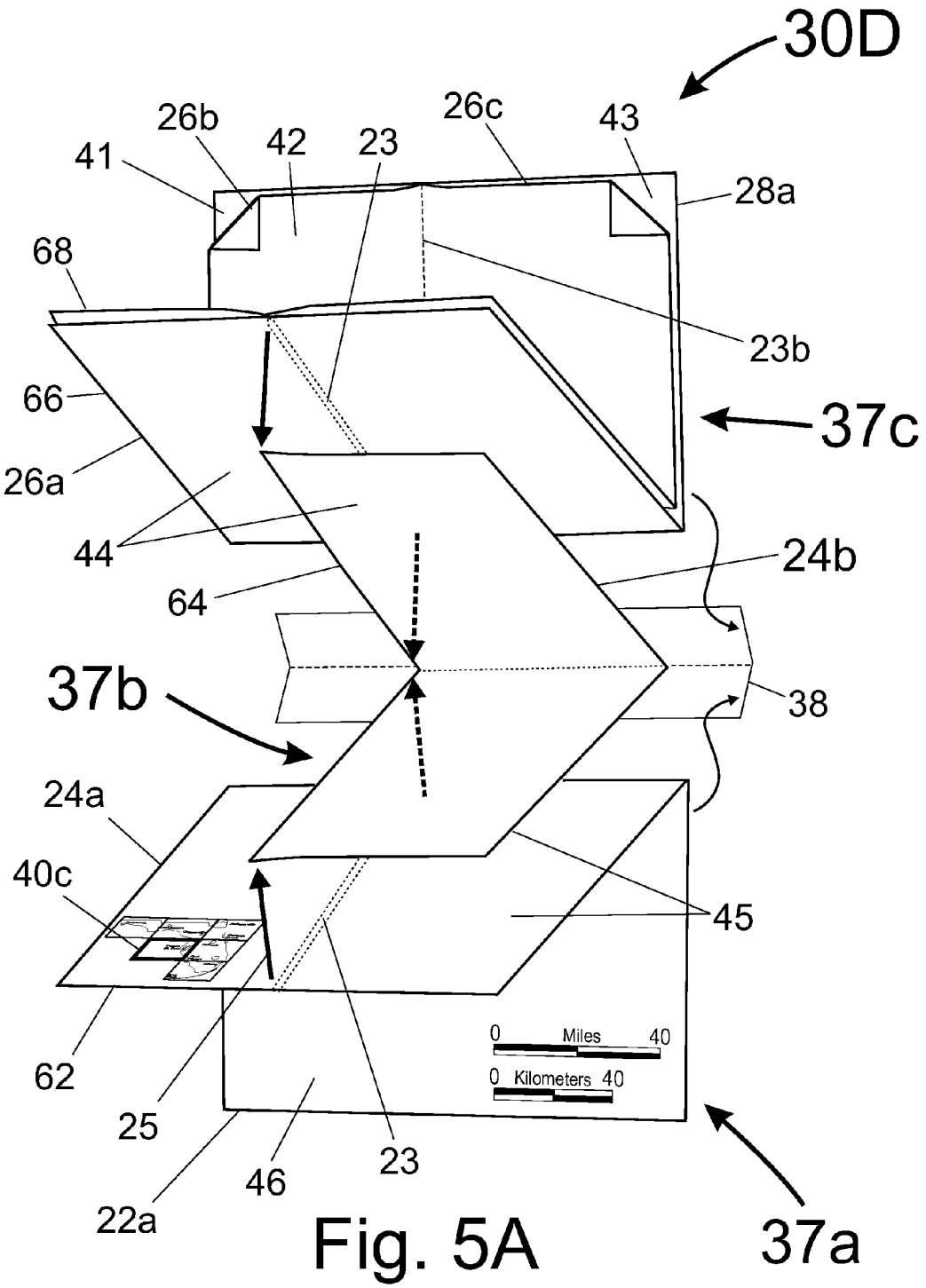

FIG. 5A A forth alternative construction example for the disclosed binding system.

Figure 5B:
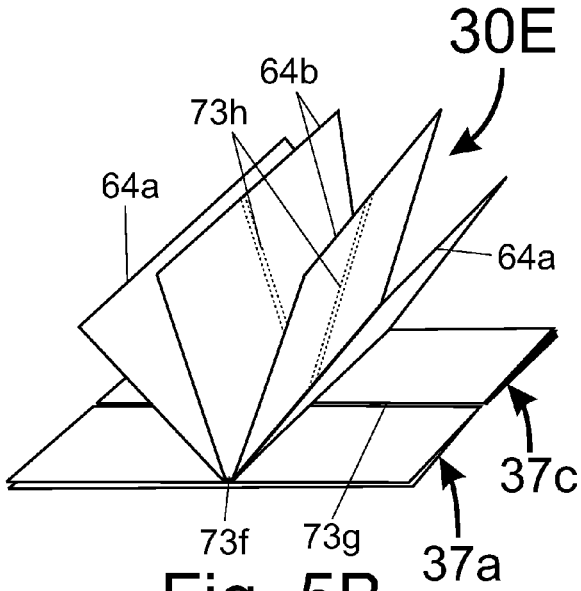

FIG. 5B A fifth alternative construction example for the disclosed binding system.

Figure 5C:
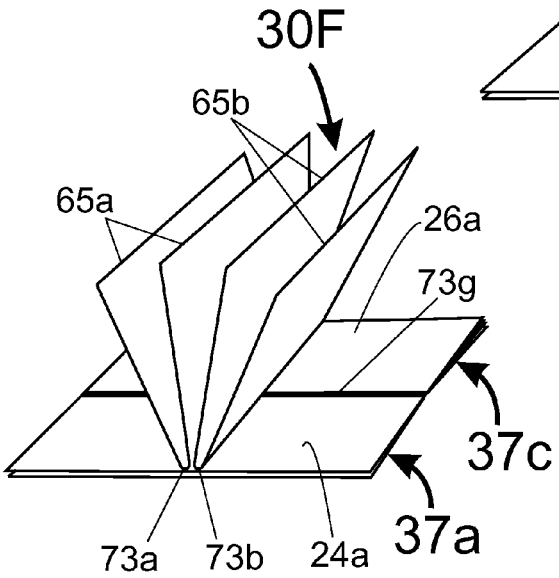

FIG. 5C A sixth alternative construction example for the disclosed binding system.

Figure 5D:
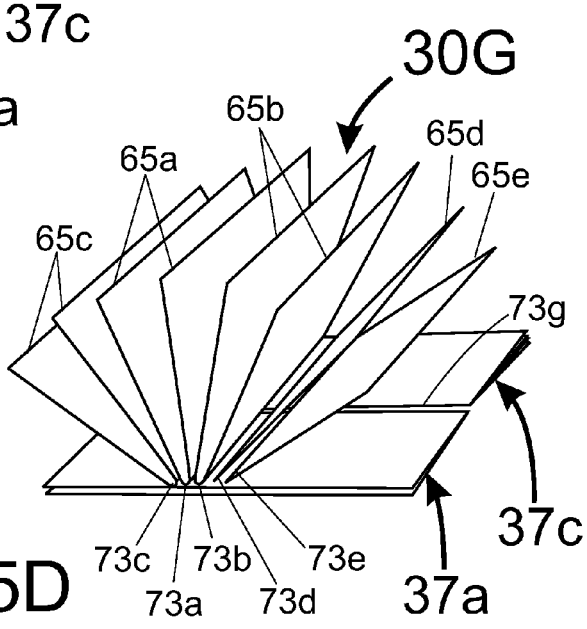

FIG. 5D A seventh alternative construction example for the disclosed binding system.

Figure 6A:
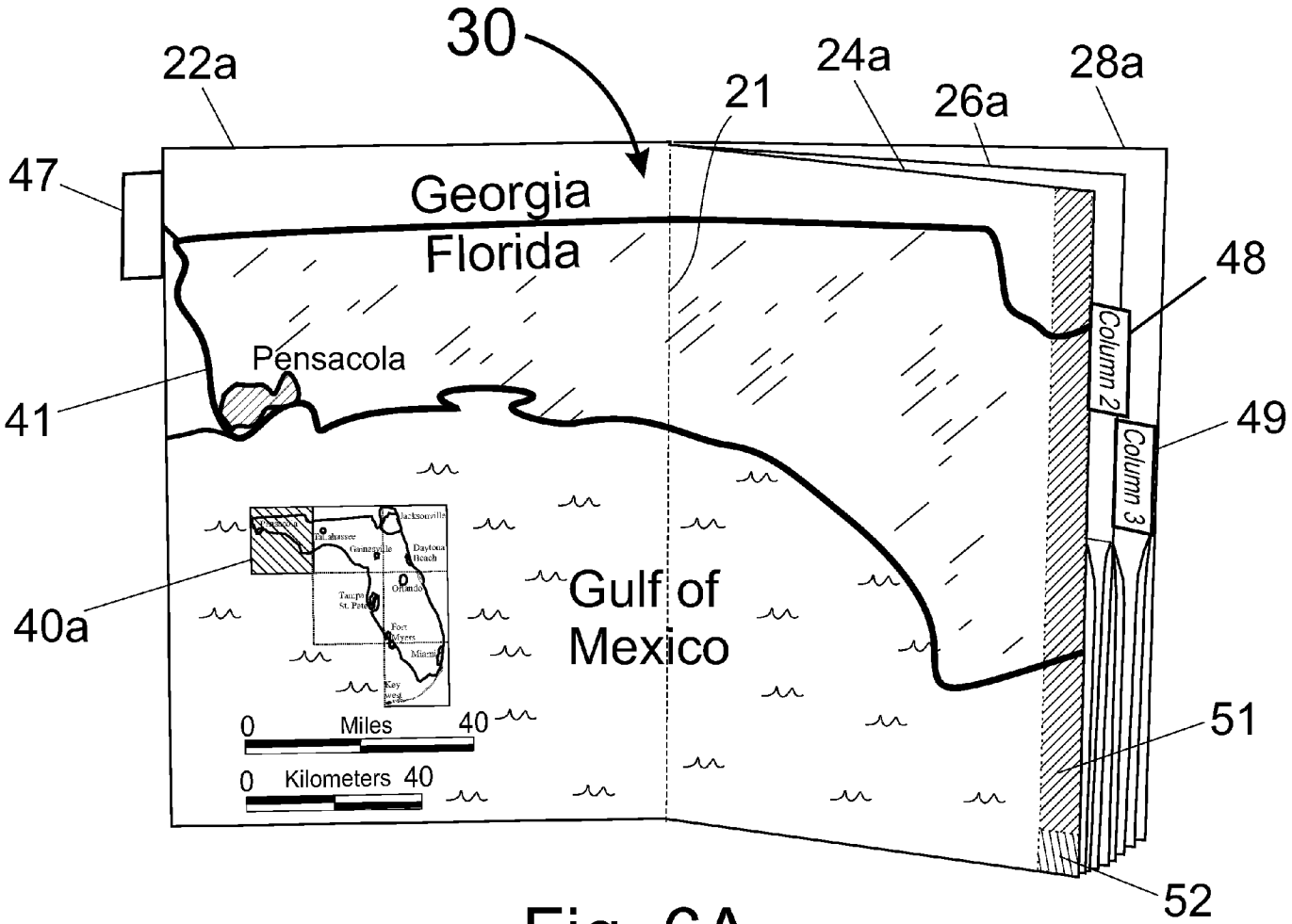

FIG. 6A Page image 41 of preferred binding system seen in FIG. 1.

Figure 6B:
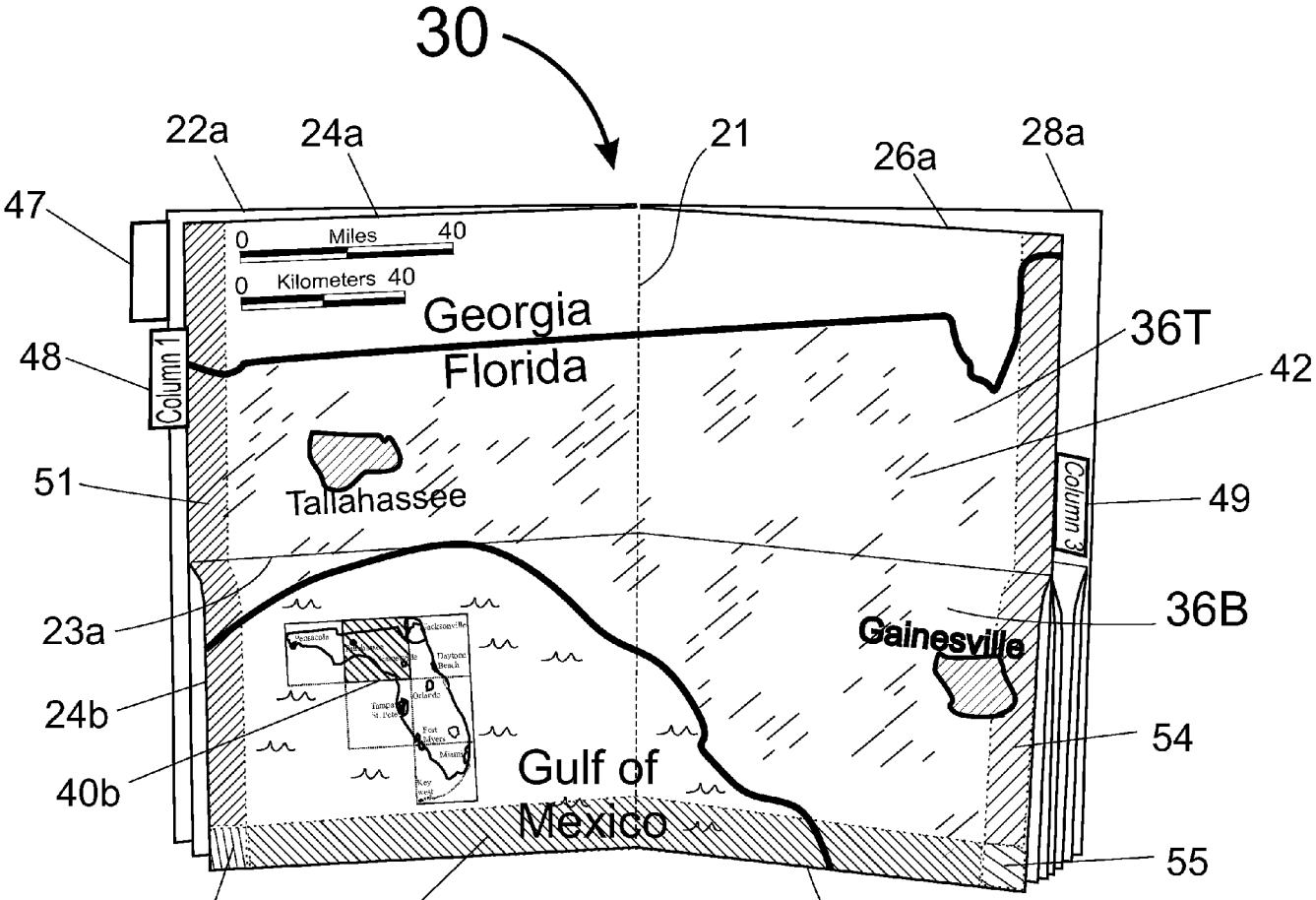

FIG. 6B Page image 42 of preferred binding system seen in FIG. 1.

Figure 7A:
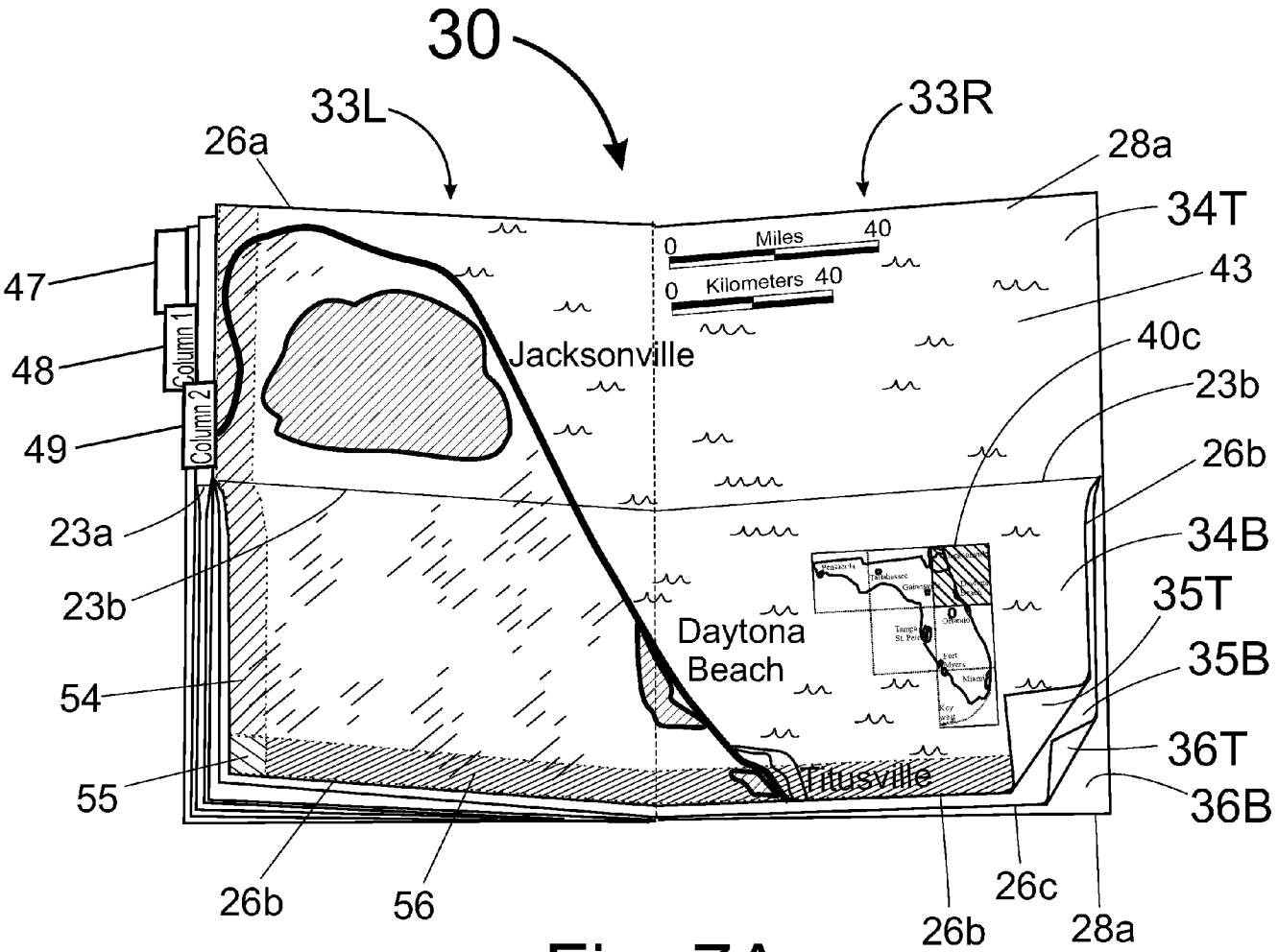

FIG. 7A Page image 43 of preferred binding system seen in FIG. 1.

Figure 7B:
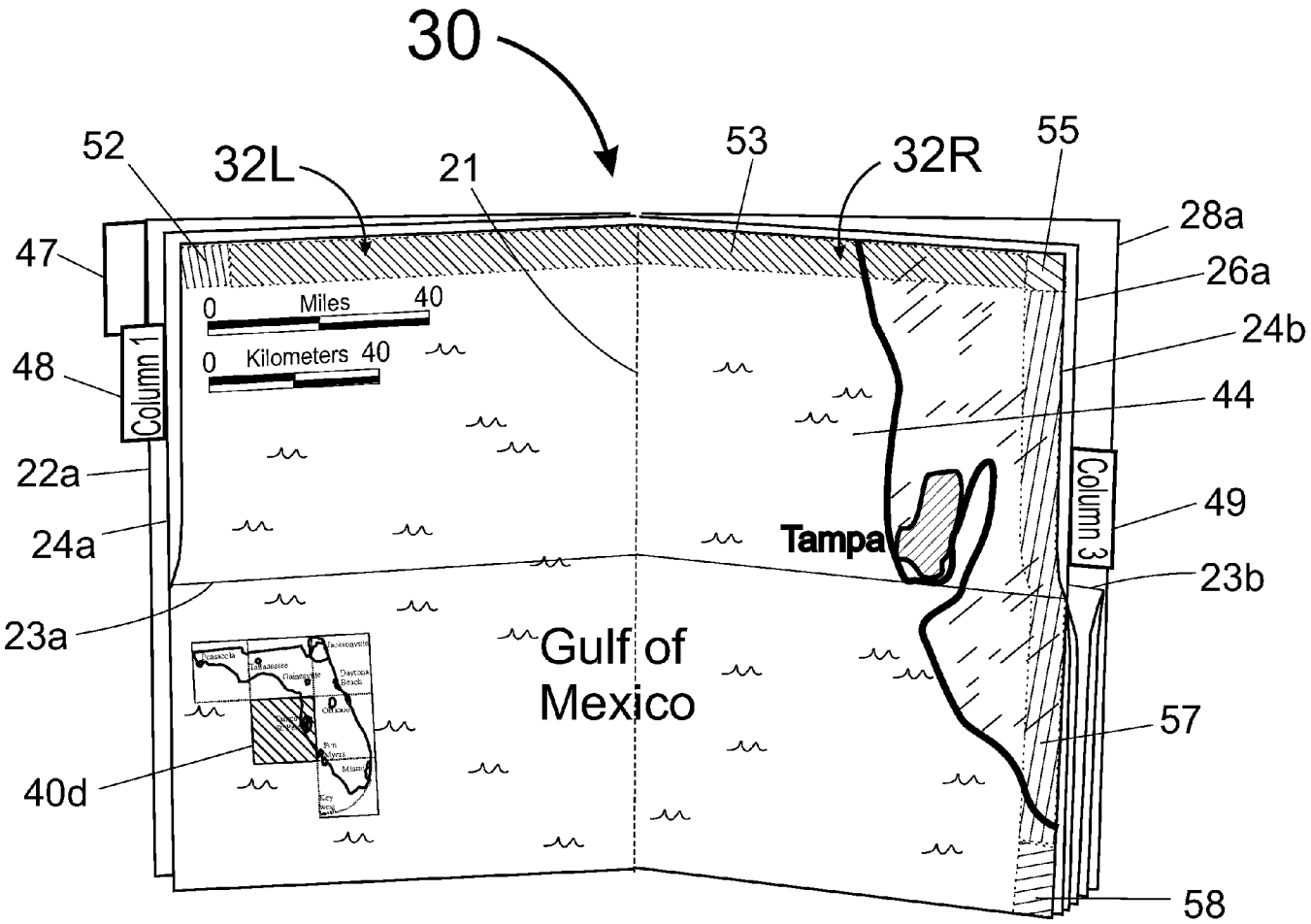

FIG. 7B Page image 44 of preferred binding system seen in FIG. 1.

Figure 8A:
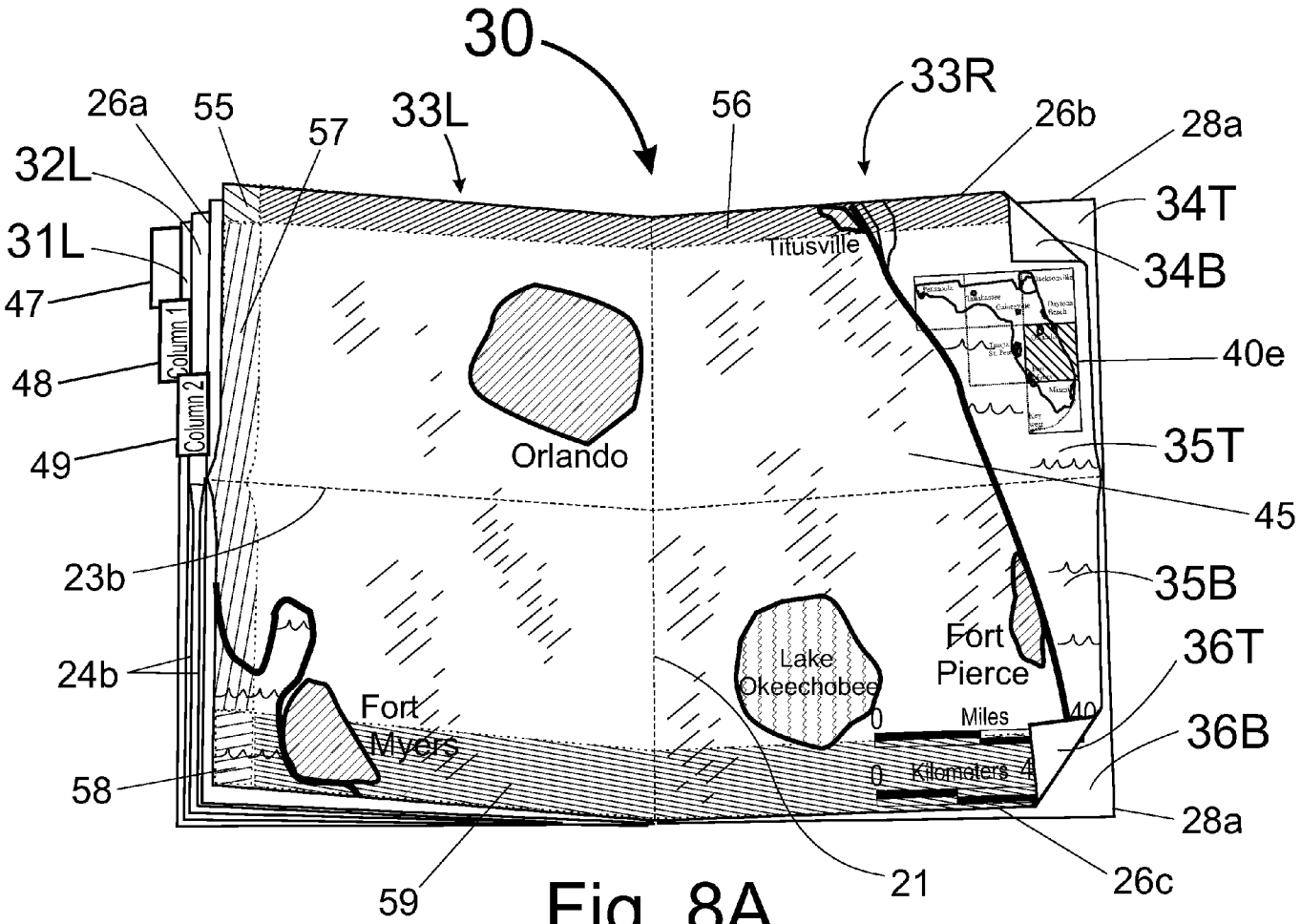

FIG. 8A Page image 45 of preferred binding system seen in FIG. 1.

Figure 8B:
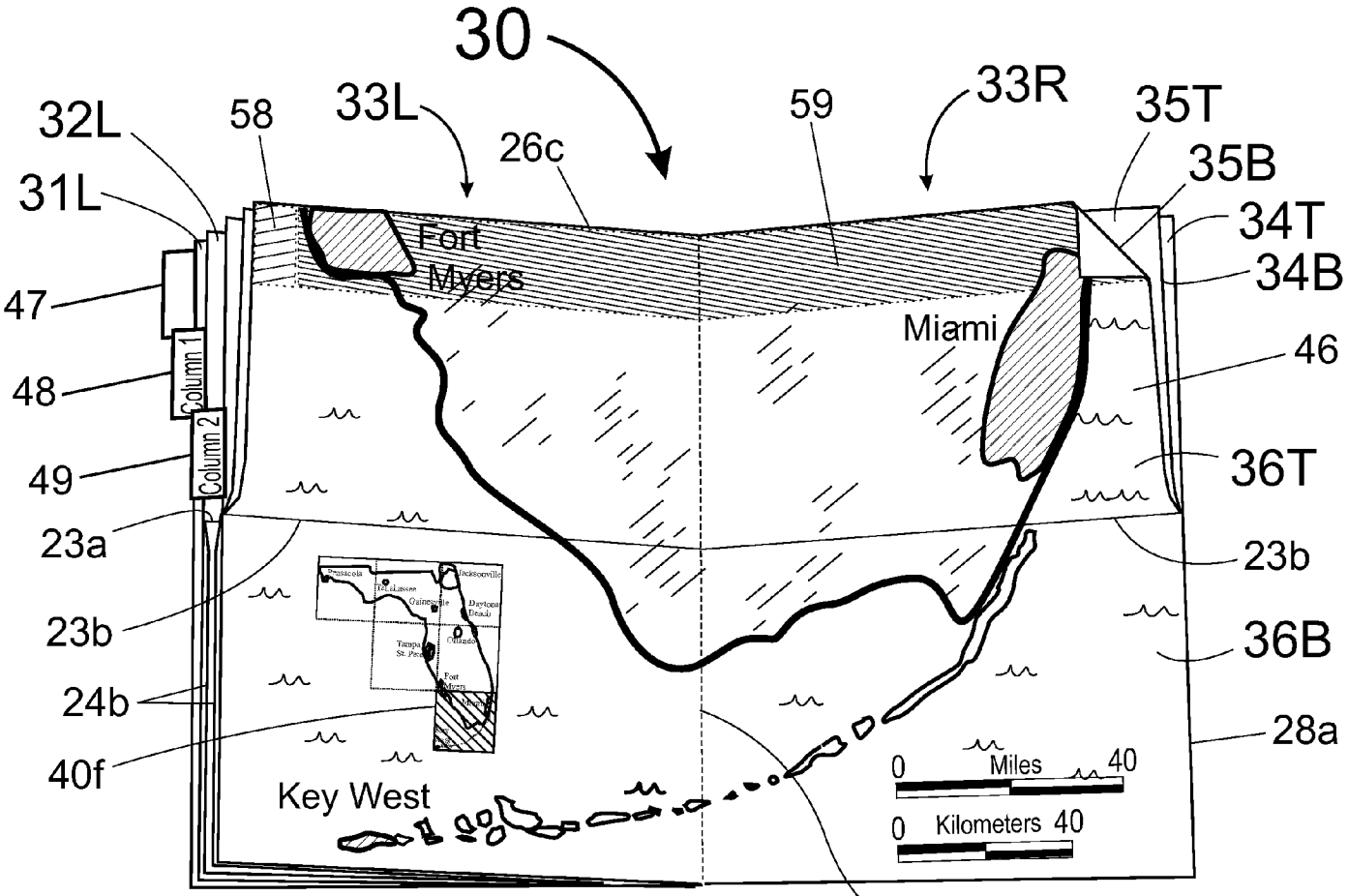

FIG. 8B Page image 46 of preferred binding system seen in FIG. 1.

Figure 9A:
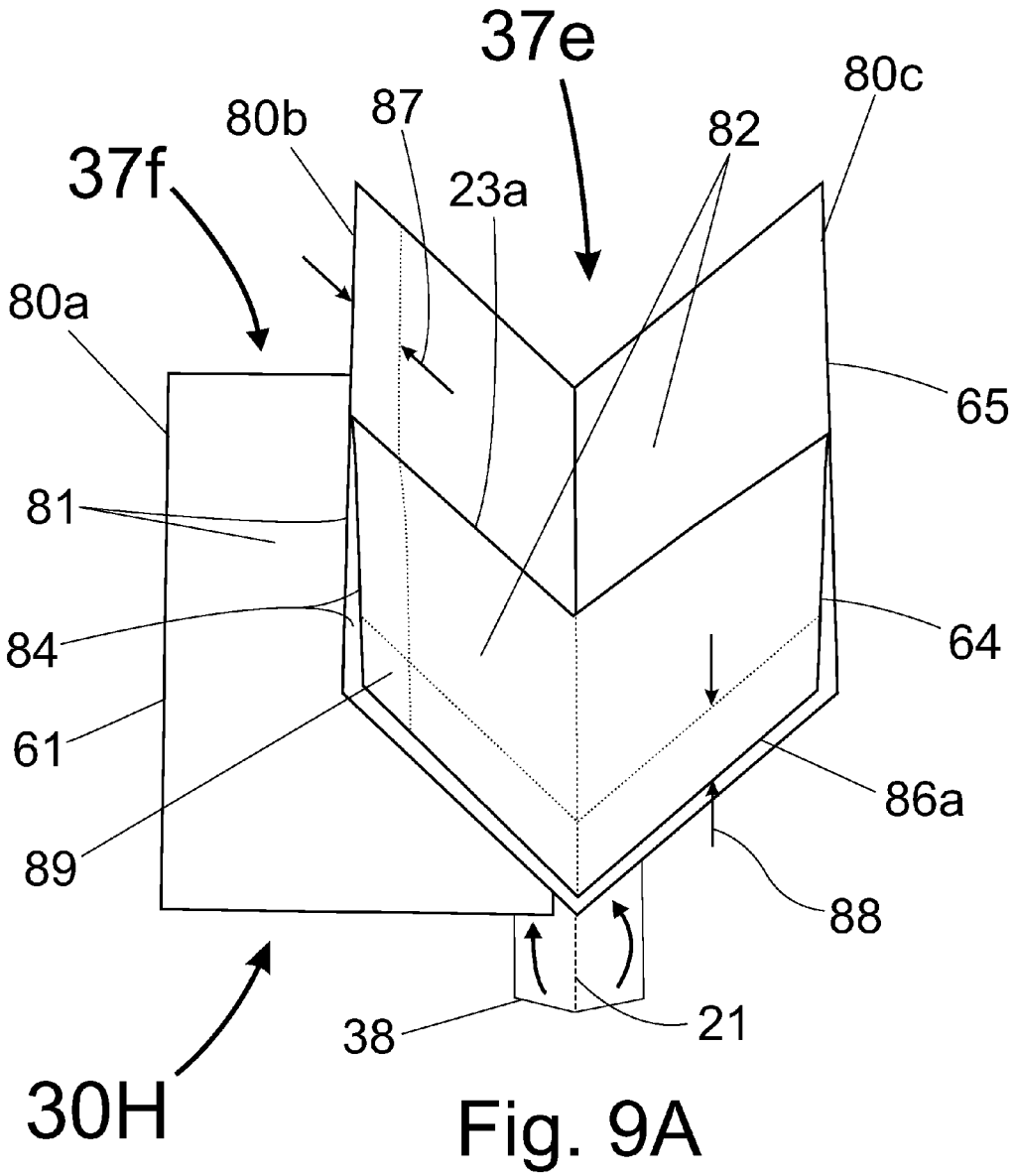

FIG. 9A An eighth alternative binding system (2 rows by 2 columns construction).

Figure 9B:
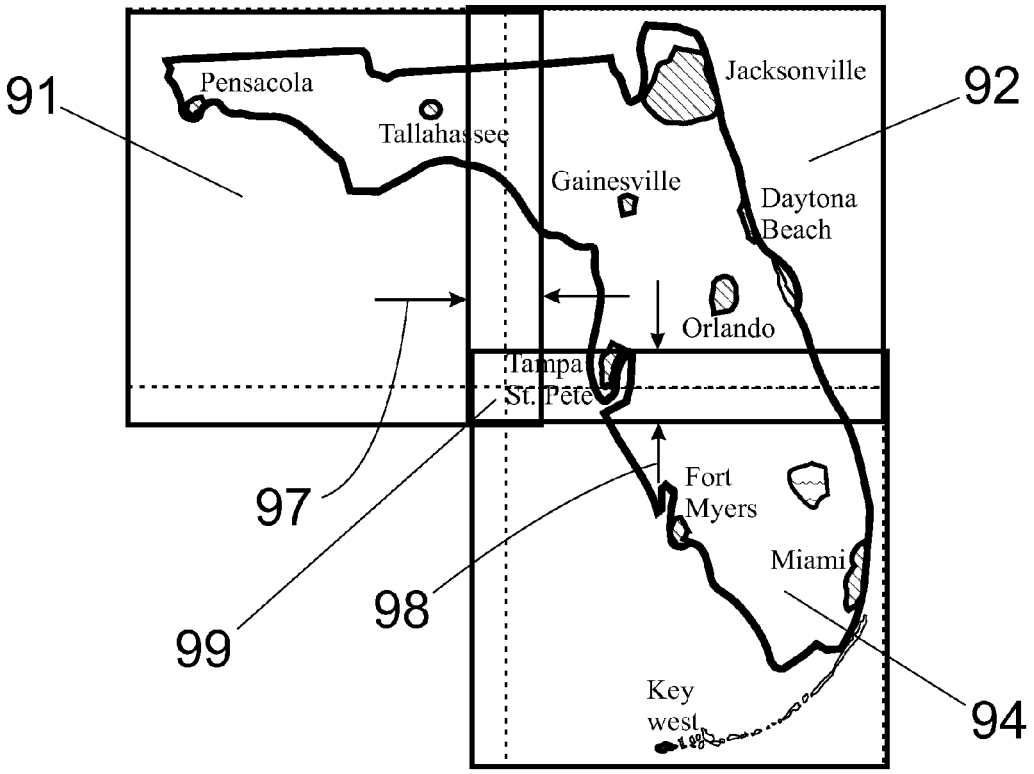

FIG. 9B Image division pattern for binding system seen in FIG. 9A.

Figure 10A:
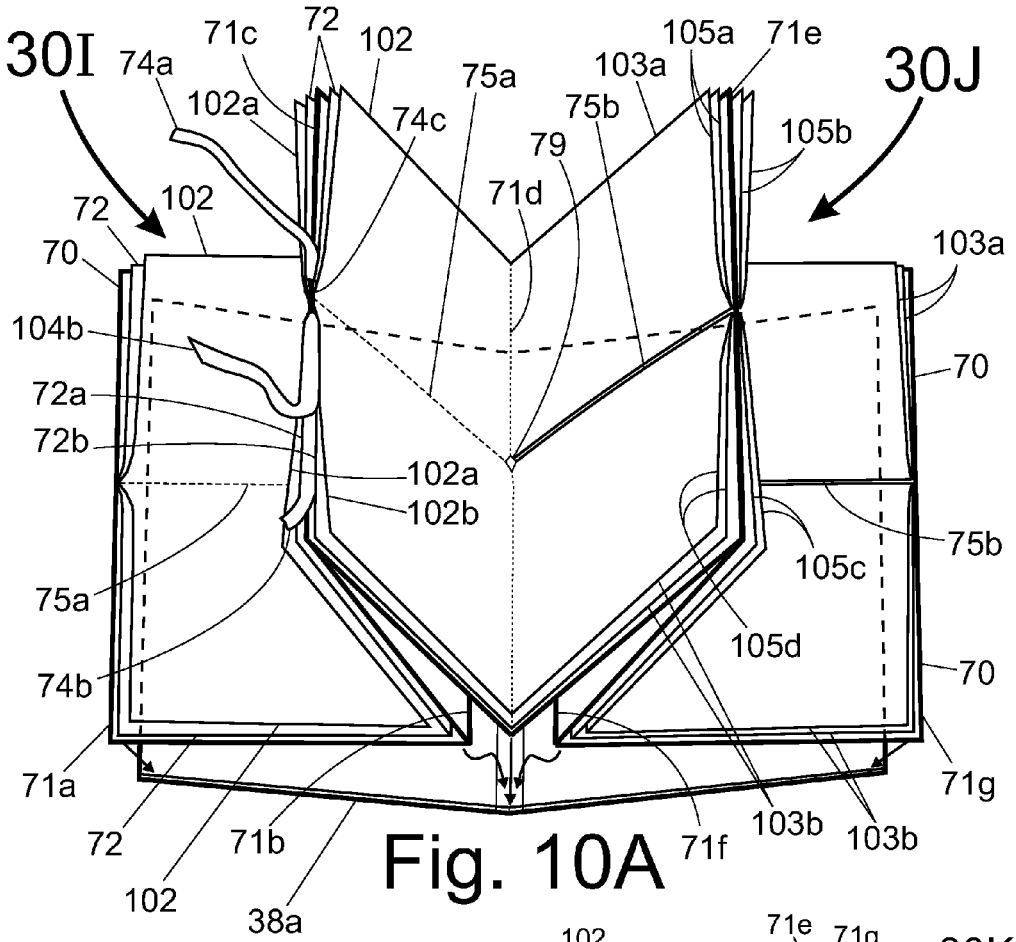

FIG. 10A Ninth and tenth alternative binding systems (5 rows by 3 columns construction).

Figure 10B:
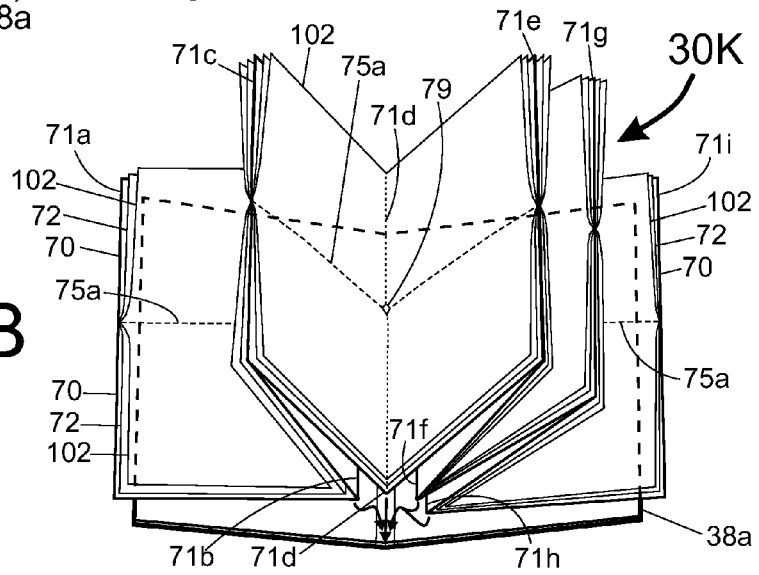

FIG. 10B An eleventh alternative binding system (5 rows by 4 columns construction).

DETAILED DESCRIPTION OF THE PREFERRED EMBODIMENTS

Binding System Construction—(FIGS. 1-1A, 2A-F, 3A-B, 4A-B, 5A-B)

In FIG. 1, we see an example of a preferred large format binding system 30. The binding system can be used with any large format image to provide an ergonomic way of presenting the large image in a small, easy to understand and easy to handle book format. Binding system 30 (here after also referred to as map 30) comprises six separate page images 41, 42, 43, 44, 45, 46, each of which present a different portion of the full map 40 (see FIG. 1A) plus appropriate overlap images 51 through 59 for that page image portion. Each page image numbers 41 through 46 will be used to refer to both the printed images (page image), as well as, the actual physical viewable surface (page view) that each page image is printed on. This simplifies, the discussion since the page image cannot be viewed without also viewing the page view the image is printed on. In this document, to make it clear to the reader, the term "page image" will be used to refer to the actual printed image, while the term "page view" will be used to refer to the actual viewed surface whether a page image is printed on it or not. Each page view 41 through 46 (viewed printable surfaces) are physically at the same location as page images 41 through 46, respectively, and can be used interchangeably in this discussion most of the time.

In FIG. 1, map 30 structurally comprises four main page sections 22, 24, 26, and 28 which are mounted on vertical binding 21. Each of the four main page section 22, 24, 26, and 28 have a single vertical main page 22a, 24a, 26a and 28a, respectively. When the main pages are folded open to position 39, page views 41 through 46 can be viewed one at a time with map 30 laying on a flat surface or held in the user's hands. The viewing area is approximately twice the surface area of map 30 when it is closed. Making the size of this viewing area (page views 41 through 46) about twelve inches by twelve inches, provides a good balance between viewing area and ease of handling. Different viewing sizes can be used for different needs.

In FIG. 1, we see that between main pages 24a and 26a is mounted a horizontal secondary page 24b. Page 24b is bonded to map 30 along horizontal binding [23] *23a*. Secondary page 24b can be flipped either downward or upward to expose page view portions 42 or 44, respectively. Between main pages 26a and 28a are mounted two secondary pages 26b and 26c along horizontal secondary spine bond (binding) 23b. Both secondary pages can be folded up or down along secondary spine 23b, so that page view 43 is shown when both secondary pages 26b and 26c are folded down. Image portion 45 is shown when secondary page 26b is folded up and 26c is folded down (as shown in FIG. 1). Page view 46 is shown when both secondary pages 26b and 26c are folded up.

In FIG. 1, we see that tabs 47, 48, and 49 are mounted on main pages 22a, 24a and 26a are. Tabs 47, 48, and 49 are labeled "Column 1", "Column 2" and "Column 3", respectively to allow the user to easily select which column in the map they wish to view. For example, lifting tab 47 labeled "Column 1" opens map 30 to the first column which has page image 41 of map image 40 (first column comprises the combined images of half columns 31L and 31R seen in FIG. 1A). Lifting tab 48 gives the user access to the second column for viewing page images 42 and 44. Lifting tab 49 gives the user access to the third column for viewing page images 43, 45 and 46. Tabs 48 and 49 can also have delegations "Column 1" and "Column 2", respectively, on their back side (see FIG. 7A), to allow the user to select a particular column even if map 30 is already open.

In FIG. 1A, we see map image 40 of the state of Florida. Map 30 is divided into vertical half columns 31L, 31R, 32L, 32R, 33L and 33R, and horizontal half rows 34T, 34B, 35T, 35B, 36T and 36B. Viewable page images (columns and rows) overlap so that portions of map image 40 are duplicated on adjacent page images in map 30. Florida map image 40 is an example of a standard map [images] *image* that could be used as a base image for map 30. Map image 40 is divided into six viewable page image areas numbered 41 through 46 for placement in map 30. These areas are identified in FIG. 1A by boxes numbered 41 through 46. Since each of these areas overlap, the page images in map 30 have overlapping sections on adjacent page images (overlapping vertically and horizontally for edges, and diagonally for corners). Each of these six viewable page areas are viewable on map 30 when map 30 is opened to a specific main page and a specific secondary page. For example, to view map area 42, map 30 is opened to "Column 2" (between main pages 24a and 26a) with secondary page 24b folded down.

In FIG. 1A, we see the coordinate system for map image 40 and the overlap border images between the different image areas 41 through 46.

Image area 41 comprises the intersection of columns 31L and 31R, and rows 34T and 34B.

Image area 42 comprises the intersection of columns 32L and 32R, and rows 34T and 34B.

Image area 43 comprises the intersection of columns 33L and 33R, and rows 34T and 34B.

Image area 44 comprises the intersection of columns 32L and 32R, and rows 35T and 35B.

Image area 45 comprises the intersection of columns 33L and 33R, and rows 35T and 35B.

Image area 46 comprises the intersection of columns 33L and 33R, and rows 36T and 36B.

The overlap (intersection) common to page image areas 41 and 42 is marked as overlap border image 51.

The overlap border image 51 is the overlap border region common to page image areas 41 and 42.

The overlap corner image 52 is the overlap border region common to page image areas 41, 42, & 44.

The overlap border image 53 is the overlap border region common to page image areas 42 and 44.

The overlap border image 54 is the overlap border region common to page image areas 42 and 43.

The overlap corner image 55 is the common overlap image (intersection) for page image areas 42, 43, 44 and 45.

The overlap border image 56 is the overlap border region common to page image areas 43 and 45.

The overlap border image 57 is the overlap border region common to page image areas 44 and 45.

The overlap corner image 58 is the overlap border region common to page image areas 44, 45 and 46.

The overlap border image 59 is the overlap border region common to page image areas 45 and 46.

In FIGS. [2D] *2A* through 2J, we see map image 40 with the different page image areas 41 through 46 shown by a dark bordering square. FIG. 2A shows the map of Florida 40 divided into six [sections] substantially equal sections. These sections are chosen to optimize the placement of cities away from the borders (overlap images) common to adjacent pages. The number and size of the view areas can depend on the detail needed in the map, use for the map, actual size of original map, and other factors. For example, a map of the United States using the disclosed binding system can represent the entire United States of America at the same level of detail as standard travel state maps. Such a map might have seven secondary pages between each of fifteen main pages. If the viewing area for the map was around twelve inches on a side, the detail of such a map would be similar to viewing a United States map seven feet tall and fourteen feet across. While a seven by fourteen foot map would be completely unworkable as a standard map, the disclosed binding system makes such a map very workable and convenient.

In FIG. 2B, we see map image 40 with all the overlap border images for page image areas 41 through 46 shown. Each page image area of the map corresponds to the actual viewable page view and page image in map 30. The overlap between these image areas allows the user to more easily follow roads and streets as they flip pages within map 30. FIG. 2C highlights two page image areas 42 and 45 with dark borders to show how these images overlap at a small rectangular image area 55 (overlap corner image). This overlap border image 55 at the corner of page image 42 and 45 (and also page images 43 and 44) helps the user understand this area of the map better, which would be split between four different pages views (42, 43, 44, and 45) if it [where] *were* not for the overlap corner image 55.

In FIG. 2D, we see a Florida map 40a which is a smaller printed version for use as a guide for the user. Guide map 40a can be printed in a corner of page image 41 on map 30. Guide map 40a would cue the user as to what section of the Florida map they were presently viewing. Thus, page image 41 on map 30 would include the addition of guide map 40a to the map image to help keep the user informed as to what part of Florida they were looking at (see FIG. 6A for an example). Image area 41 is marked on guide map 40a with a dark box, but image area 41 can be marked by any of a number of methods, such as, darkening or lightening that area of map 40a, coloring that area, changing the color hue of that area, placing colored borders around image area 41, etc., so the user can easily identify the portion of map image 40 they are looking at. While this addition of guide map 40a may seem minor, when combined with similar guide maps on each of the image areas 42 through 46, the user has a powerful way to visually determine where they are in the overall map 40. And thus makes it easy to quickly navigate the pages of map 30.

In FIG. 2E, we see a Florida map image 40b which is a smaller printed version for use as a guide for the user. Guide map 40b can be printed in a corner of page image 42 on map 30. Guide map 40b would cue the user as to what section of the Florida map they were presently viewing. Thus, image 42 on map 30 would include the addition of guide map 40b to the map image to help keep the user informed as to what part of Florida they were looking at (see FIG. 6B for an example). Image area 42 is marked on guide map 40b with a dark box, but area can be marked by any of a number of methods, such as, darkening or lightening that area of map 40b, coloring that area, changing the color hue of that area, placing colored borders around image area 42, etc.

In FIG. 2F, we see guide map 40c for placement on page image 43 of map 30 to help guide the user through the many pages of the map. An example of guide map 40c being used can be seen in FIG. 7A. Similarly, in FIG. 2G, we see guide map 40d for placement on page image 44 of map 30 (see FIG. 7B). By placing this small guide map on its page image 44 of map 30, the user can more easily tell where they are in the map as a whole, and thus[,] know in which direction they need to turn [page] *the pages* (up, down, left, or right) to reach their desired view[. Since] *since* turning pages in the direction you desire *to* move, moves you toward that section area of the map. Thus, the disclosed binding system is very intuitive for the user when combined with maps.

In FIGS. 2H and 2J, we see Florida map images 40e and 40f, respectively, which are smaller printed [version] *versions* of map image 40 for use as a guide for the user. Guide maps 40e and 40f can be printed in a corner of page images 45 and 46, respectively on map 30. Guide maps 40e and 40f would cue the user as to what section of the Florida map they were presently viewing. FIG. 8A shows guide map 40e being used in page image 45. FIG. 8B, shows guide map 40f being used in page image 46 of map 30. The image areas 45 and 46 are marked on guide maps 40e and 40f, respectively, with a dark box, but these image areas can be marked by any of a number of methods, such as, darkening or lightening these areas, coloring that area, changing the color hue of that area, placing colored borders around these areas, etc.

In FIG. 3A, we see the construction of map 30[. Where map 30 can] *which* structurally comprises three main sections 37a, 37b and 37c of printable sheet stock of paper, polymer, or other printable material. Printable section 37a comprises a sheet 62, tabs 47 and 48, and spine bonding zone 23. Sheet 62 is folded along a vertical line to form main pages 22a and 24a. Tabs 47 and 48 are placed on the outer edges of main pages 22a and 24a, respectively, to identify each main page section which contains that particular column of the map image. Tab 47 opens to the first viewable column (columns 31L and 31R) and tab 48, when lifted, opens to the second viewable column (columns 32L and 32R).

In FIG. 3A, printable section 37b comprises a half sheet 64 of printable material, and is used to form secondary page 24b. The edge of sheet 64 is bonded to sheets 62 and 66 along foldable spine 23a formed by bonding one edge of sheet 24b to bonding zone 23. Thus, sheet 64 (secondary page 24b) bonds sheets 62 and 66 together, and includes spine strip 38 to provide additional support for map 30 and also provide main spine 21. With this configuration secondary page 24b is foldable along both its secondary spine 23a and main spine 21 at the same time. Sheet 64 becomes part of the second viewable column image (columns 32L and 32R) providing row images 34B and 35T for the second viewable column.

In FIG. 3A, printable section 37c comprises two printable sheets 66 and 68. Sheet 66 is folded along a vertical line to forms main pages 26a and 28a. Tab 49 (Column 3) is mounted to the edge of main page 26a so that when tab 49 is lifted, the third viewable column (columns 33L and 33R) is shown. Sheet 68 is bonded to sheet 66 at foldable secondary spine 23b so that sheet 68 forms secondary pages 26b and 26c. Main spine tape 38 can be a cloth strip bonded to the outside of sheets 62 and 66 to hold the entire map assembly 30 together in the form of a book with main spine 21 (see FIG. 1). Main spine tape 38 can be made larger to form an entire cover for the disclosed map assemblies, and may comprise a hard cover book like cover from the map assemblies. When map 30 is opened with main page 24a on the left and main page 26a on the right (Column 2 view), secondary page 24b can be flipped [up] *down* along spine 23a to show image 42 (as shown in FIG. 6B) or flipped up along horizontal spine 23a to show image 44 (as shown in FIG. 7B) to the user. Similarly, when opened with main page 26a on the left and main page 28a on the right (Column 3 view), secondary pages 26b and 26c can both be flipped down along horizontal secondary spine 23b to show page view 43 (as shown in FIG. 7A). With page 26b folded up and page 26c folded down, image 45 is shown (as shown in FIG. 8A). With both pages 26b and 26c folded up, page view 46 is shown.

In FIG. 3A, map image 40, is printed on sheets 62, 64, 66 and 68 before they are bonded together (sheet 64 bonded to sheets 62 and 66 along secondary spine bond zone 23; sheet 68 bonded to sheet 66 along horizontal secondary spine 23b; and the outside portions of sheets 62 and 66 bonded along vertical spine strip 38). Map image 40 is printed on map 30, such that, the cover image (see FIG. 1) is printed on the first side of main page 22a and column 31L (see FIG. 1A) is printed on the second side of main page 22a (containing left half of image 41). The image in column 31R is printed on the first side of main page 24a (containing right half of image 41) adjacent column image 31L. The image in column 32L (containing left half of images 42 and 44) is printed on the second side of main page 24a and the left side of secondary page 24b (left half of sheet 64). The image in column 32R is printed on the first side of main page 26a and the right half of secondary page 24b (right half of sheet 64 front an back). The image in column 33L is printed on the second side of main page 26a and the left side of secondary pages 26b and 26c (left half of sheet 68 front and back). The image in column 33R is printed on the first side of page 28a and the right side of secondary pages 26b and 26c (right half of sheet 68 front and back).

First Alternative Binding System Construction—FIG. 3B

In FIG. 3B, we see the construction of alternate binding system 30A (book structure). This construction is very similar to the construction of map 30. The differences between map 30 and alternate book structure 30A, comprise sections 37a being replaced with a second section 37c and section 37b being replaced with section 37d. The construction of this second section 37c on the left can be identical to the construction of the first section 37c on the right, but can contain different printed images. New section 37d comprises a single full sheet of printed material 65 with an expansion notch 79 located at the intersection of main spine 21 and secondary spine 23c to allow for easier folding of sheet 65 both horizontally and vertically at the same time. Bonded secondary spine 23c on sheet 65 is bonded to sheet 66 at bonding zone 23 on both component portions 37c as shown by positioning arrows 25a. Note that bond zone 23 extends across both sheets 66 on the left and right sections 37c. This construction provides two horizontal secondary pages for every viewable vertical column. This provides three viewable horizontal page views within each viewable vertical column, and provides a three-by-three map layout with nine viewable page views (see FIG. 4C showing three columns each with three rows) providing three extra viewable pages 76 than are needed for Florida map image 40. This is in contrast to map 30 which only has six viewable pages: one viewable page view in column one, two viewable page views in column two, and three viewable page views in column three.

Second Alternative Binding System Construction—FIG. 4A

In FIG. 4A, we see an example of an alternative map 30B, which can [comprises] *comprise* the same information (map image 40) as map 30 and can operate in the same way as map 30. Map 30B comprises sections 37a and 37c just like map 30, but instead of center section 37b, map 30B [comprise] *comprises* center section 37e. Center section 37e comprises half sheet 64 bonded along horizontal secondary spine [23c] *23d* to full sheet 65. The image of column 32L on map 30 that was on the second side of page 24a can now be printed in map 30B on the front left side of sheet 65 and the left side of sheet 64. Sheet 64 is printed substantially the same as before. This leaves the second side of page 24a blank so that it can be bonded to the back left surface of sheet 65 as shown by positioning arrows 25c. Thus, page 24a and the left half of sheet 65 can become as if they were a single page after bonding. Similarly, the image of column 32R that was printed on the first side of page 26a in map 30, can now be printed on the front right half of sheet 65 in map 30B. This leaves the first side of page 26a blank so that it can be bonded to the back right surface of sheet 65 as shown by positioning arrows 25d. Thus, page 26a and the right half of sheet 65 can become as if they were a single page after bonding. After this bonding of pages 24a and 26a to the back side of sheet 65, a spine [cover] *strip* 38 can be bonded to the spine of map 30B to provide structural support. However, because of the bonding of pages 24a and 26a to sheet 65, [cover] *spine strip* 38 is not absolutely needed, but can still be bonded over the vertical spine to cosmetically hide the folded vertical edges of map 30B. In some configurations, non-bonded zones 27a and 27b can be provided to allow the main pages to more easily be opened to a flat surface. These non-bonded areas or zones 27a and 27b can be approximately one-quarter inch wide and extend the length of the folded sheet. The actual width of the non-bonded zones can vary depending on the desired properties. These non-bonded zones 27a and 27b allow secondary pages, like secondary [page] *sheet* 64, to be more easily turned by the user, and reduce crumpling of the sheets at the folds. Another way to visualize this is to consider non-bonded area on either side of folded edge 29a of sheet 65 that would match up with areas 27a and 27b when the sheets were bonded together. The use of non-bonded zones like 27a-b become more important as greater numbers of main pages are used, and the main spine becomes stiffer. Non-bonded areas similar to bond zones 27a-b can be especially useful with binding system structures like binding system 30C where many main pages can be formed from a single sheet.

In FIG. 4A, section 37e can be alternatively bonded only along horizontal spine 23 (instead of bonding the entire back side of sheet 65 to the second side of page 24a and the first side of page 26a). This alternative bonding along spine 23 (see positioning arrows 25e and 25J) allows sheet 65 to form two separate secondary pages and sheet 64 forming a third secondary page between them. These three secondary pages, thus provide four separate page views for "Column 2" instead of just two. This is one example of how additional secondary pages can be added to a particular column in the map. This alternative construction only connects sections 37a and 37c of map 30B along a thin line (spine 23), so that spine [cover] *strip* 38 is needed to provide structural support to the vertical spine (support for sheets 62 and 66 along their vertical folded edges). The additional two secondary pages formed (formed by sheet 65) by this bonding method can be used to show larger maps or additional information or features.

Third Alternative Binding System Construction—FIG. 4B

In FIG. 4B, we see a third alternative example book structure 30C (also called binding system) using the disclosed binding system. This particular design is made for continuous roll printing and binding. Book structure 30C comprises two roll sheets 70 and 72. First sheet 70 is on the bottom and can be printed on both sides, and provides the main vertically bound pages for book structure 30C. Secondary sheet 72 can be rolled on top of sheet 70 and can be printed on both sides and provides the secondary horizontally bound pages for book structure 30C. Notice that book structure 30C can be rotated ninety degrees so that horizontal bound pages become vertical bound pages for the images in book structure 30C. These printed sheets 70 and 72 can be rolled against each other during manufacture and aligned longitudinally so that a longitudinal bond line 73 can be applied to sheets 70 and 72 to bond them together. Sheets 70 and 72 after bonding along line 73 would be cut into individual lengths to form book structure 30C as shown in FIG. 4B. Secondary sheet 72 can have transverse perforations lines 72a-d to allow secondary sheet 72 to be easily split into separate sheets after bonding along line 73. In FIG. 4B, perforated lines 72a and 72b allow sheet 72 to be split near main page edge 71c, and perforated lines 72c and 72d allow sheet 72 to be split near main page edge 71e (vertical page edge). These perforated lines on the secondary sheet 72 allow narrow strips 74a and 74b to be removed (sheet 72 also had narrow perforated strips attached to perforations 72c and 72d which have already been removed in FIG. 4B). Narrow strips 74a-b are disclosed here, but a single perforated line can be used. The removal of narrow strips 74a-b are used here to help align perforated edges 72a-b with folded edge 71c (for cosmetic reasons), and similarly with perforated edges 72c-d at folded edge 71e. A single perforated line near edge 71c and 71e can also be used to split sheet 72 and form substantially the same individual secondary page sheets as shown (see secondary page sheets 63b and 63c, the other four secondary pages formed by sheet 72 are not labeled). These perforations can be designed so that when sheet 72 is folded as shown in FIG. 4B, the perforations will tend to split to form the shown book structure 30C.

In FIG. 4B, the four main pages (see edges 71a, 71c, 71e and 71g) will form three viewable columns as shown. Bond line 73 binds sheets 70 and 72 together along a longitudinal line along the centerline of the sheets. Bond line 73 forms three horizontal secondary spines along its length one secondary spine for each vertical column. Bond line 73 creates two secondary sheets with sheet 72 for each vertical column when perforated lines [74a-d] *72a-d* (edges) are separated. These two horizontal secondary sheets formed three rows of viewable page views within each of the three viewable columns. Thus this design provides a 3×3 grid of viewable image pages (three columns each with three rows). This provides nine separate viewable pages as seen in FIG. 4C by the dashed grid. This particular design can also be used to hold Florida map image 40 similar to the way map 30 does, however, the three lower left viewable pages 76 are not needed for map 40 since that map only occupies the six image pages seen in FIG. 1A. These extra page views 76 can be used to hold other information if desired (such as maps of cities on the west coast of Florida, etc.).

In FIG. 4B, we see first sheet 70 made of printable material such as paper or polymer film. A perforated sheet 72, also of similar printable material, is stacked atop the first sheet to form a stack of sheets (70 and 72). In FIG. 4B, narrow perforated strips 74a and 74b are shown in various states of separation after perforated sheet 72 was bonded to first sheet 70 along longitudinal bond 73. Longitudinal bond 73 extends along the longitudinal axis substantially at the centerline of the stack of sheets 70 and 72. Additional perforated sheets can be stacked on perforated sheet 72 (see FIG. 10) with all the sheets bonded together along the same longitudinal bond 73 to provide additional secondary pages (with spines perpendicular to main spine *strip* 38. The perforated sheets can be perforated in two places and perpendicular to the longitudinal axis in this example. The left and right ends of sheets 70 and 72 are shown cut to illustrate construction of a three-by-three book structure (see three-by-three page images shown in FIG. 4C that could be printed on book structure 30C). Sheets 70 and 72 can be cut to longer lengths to allow for more than two perforation strips (like perforation strips 74a and 74b) between the left and right ends of the book structure. With additional longitudinal length, first sheet 70 and perforated sheet 72 can be folded additional times to form additional vertical main pages (outward folds). These perforations 72a-d are sufficiently strong to hold sheet 72 together during rolling, stacking and/or bonding. After longitudinal bonding at line 73, the stack of sheets is folded outward at perforation strips 74a-b (outward folds 71c and 71e of first sheet 70), and inward midway between the perforations at fold 71d and inward midway between the ends of the stack of sheets and the nearest perforation at folds 71b and 71f. This results in a corrugated folded pattern for the sheets as shown. The perforations can also be sufficiently weak that they can easily be separated after bonding. With the proper perforation strength, the perforation may be designed to start separating as the sheets are folded at outward folds 71c and 71e. A second bonding means is applied to the inward folds of the stack of sheets to bond the inward folds 71b, 71d, and 71f substantially together to form a book structure. Inward folds 71b, 71d, and 71f can be bonded in a number of ways. For example, the back surface of sheet 70 can be bonded to itself between folds 71b and 71d, and between folds 71d and 71f to form a book like structure. Inward folds 71b, 71d, and 71f can also be bonded with a spine [structure] *strip* 38 which can consist of a fabric strip and adhesive, as shown, or a full hard bound book cover (see FIG. 10), or other binding system (e.g. spiral binding, ring binder, etc.). Additional inward folds can be bonded in the same way if sheets 70 and 72 are made longer.

In FIG. 4B, book structure 30C can be made more ergonomic by providing two closely spaced perforated lines 72a and 72b instead of a single perforated line. The pair of perforated lines 72a and 72b, create a pair of narrow strip 74a and 74b defined on secondary sheet 72. Strips 74a-b are shown partially removed in FIG. 4B. If more than one perforated secondary sheet is used, additional strips could also be used for each perforated secondary sheet. After construction, narrow strips 74a-b can be removed from between the two closely spaced perforation lines 72a and 72b as shown. Note similar narrow strips were removed from perforation lines 72c and 72d. By removing these perforated portions of sheet 72, outward folded edge 71c can extend beyond perforation edges 72a and 72b since a portion of perforated sheet 72 has been removed with narrow strips 74a-b. This provides the advantage that the perforated edges 72a and 72b are recessed, which allows the user to more naturally turn folded edge 71c without accidently contacting and turning perforated edges 72a-b. Notches 74c-d are used to provide the secondary pages formed by sheet 72 with the ability to be smoothly turned. Without notches 74c-d, the secondary pages formed by sheet 72 would tend to bind at the intersection of outward fold edges 71c and 71e, and bonding line 73. By providing these small notches 74c-d, perforated sheet 72 is not bonded to edge 71c at bond line 73, which would tend to bow sheet 72 near edge 71c if sheet 72 were bonded there. Thus, notches 74c-d in sheet 72 allows sheet 72 to more easily fold up and down without binding or tearing.

The disclosed binding systems seen in FIGS. 1 through 4B, can easily be made larger by increasing the number of main pages (vertical oriented pages in this example to increase the number of columns) and the number of secondary pages (horizontal oriented pages in this example to increase the number of rows). To increase the number of main pages in FIG. 4B one only need lengthen the printed section *before* cutting it free. For example, if an additional viewable page width is allowed to extend [pass] edge 71g before cutting, the map could have four viewable columns. Extending the map further before cutting would allow additional columns. The main pages (vertical pages in example 30C) can be added, almost without limit, because each main page functions substantially independently from the other main pages. Thus, hundreds of main pages can operate substantially independent of the others and be workable in a bound book using standard binding methods for books of such thickness. To add more secondary pages (horizontal spine pages in example 30C) one only needs to add more layers of sheets similar to sheet 72 on top of those already there (see FIG. 10). For example, if two sheets like sheet 72 are bonded on top of sheet 70 and all three sheets bonding together along line 73, then four secondary page sheets will be formed instead of just two (two sheets on the top and two sheets on the bottom in each column). The four secondary page sheets in cooperation with the main pages provide five horizontal rows of viewable page views. In a similar manner, additional main pages and secondary pages (vertical columns and horizontal rows in this example, respectively) can be added to produce nearly any sized map with nearly any number of rows and columns.

Each main page operates nearly independent of the other main page, with almost no limit to how many main pages (i.e. vertical main pages formed by edges 71a, 71c, 71e, and 71g, in FIG. 4B, and vertical main pages 22a, 24a, 26a and 28a in FIG. 1, and horizontal main pages [71a, 71c, 71e, 71g] *22a, 24a, 26a and 28a*, in FIG. 5A) that can be placed in a map of the disclosed design. This is because pairs of main pages can be stacked without significantly [effecting] *affecting* adjacent main page pairs (i.e. vertical page pairs 37c and 37d as seen in FIG. 3B). The spine for the main pages can be just made wider and wider as needed. While the number of main pages is nearly unlimited, the number of secondary pages (i.e. horizontal secondary pages 24b, 26b and 26c seen in FIG. 3A, and vertical secondary pages 24b, 26b and 26c seen in FIG. 5A) between each adjacent main page pair is limited by how many secondary pages can be folded twice (once along the secondary pages' spine [(i.e.]; *e.g.,* along secondary spines 23b and 23c in FIGS. [3b] *3B* and 4A) and then a second time along the main pages' spine (see main spine strip 38 in FIGS. 3A, 4A and 5A) when the map is closed. Expansion notch 79 helps provide room for folding secondary pages 63b and 63c, as seen in FIG. 3B. Notch 79 reduces binding of the pages by removing a portion of the secondary page sheet 65 (see FIG. 3B) at the intersection between the main spine and secondary spine, so that, the secondary pages 63b and 63c can expand into the notch area when folded twice (cross folded). Thus, notch 79 can allow a greater number secondary pages to be used and still allow the map to fold substantially flat when closed. Folding the map flat does not become a problem until a large number of secondary pages are placed between the same two adjacent main pages.

In FIG. 4C, we see the map grid layout for book structure 30C seen in FIG. 4B. Map image 40 is the same image seen in Map 30 and seen in FIGS. 1-1A. Map 30, however, has nine viewable pages comprising the six viewable pages 41-46 of map 40 (see FIG. 2B), and three additional viewable pages 76. These three additional pages 76 are left blank in this example, but could include ocean bottom maps for the gulf of Mexico and/or other information if desired. Both book structures 30A and 30C are constructed with vertical columns of viewable pages with each column having three rows of images for a total of nine page images. This gives book structures 30A and 30C three extra viewable pages 76 than map 30. Note that the total number of viewable columns formed by book structure 30C is controlled by where edge 71g is cut. If sheets 70 and 72 were allowed to continue further before being cutting, then additional columns can be added to the map simply by folding additional inward and outward folds to form additional pages on the extended sheet.

Fourth Alternative Binding System Construction—FIG. 5A

In FIG. 5A we see a fourth alternative binding system map 30D, where the main pages are oriented horizontally. This is perpendicular to the designs seen in FIGS. 1 through 4C which uses main pages with vertical bindings. Map 30D has four main pages 22a, 24a, 26a and 28a which are mounted to binding strip 38 so that they form a single horizontal spine. Secondary pages 24b, 26b and 26c mount along vertical lines near the midpoint of the main pages to provide two vertical secondary spines 23a and 23b. Secondary spines 23a and 23b are located near the midpoint the main pages 24a & 26a, and 26a & 28a, respectively, such that the main spines and the secondary spines substantially bisect each other at right angles (perpendicular). The map image printed on map 30D is the same as the map image on map 30 with page image 41 in the upper left-hand corner and page image 46 in the lower right-hand corner of the map. The reader may have noticed that for this example, map 30D is essentially identical to map 30 in construction, but rotated ninety degrees. This is because both are a 3×3 page image map. In fact, the page images of Map 30D are the same as those for map 30, only the orientation of the map image has been changed and they are now printed on different physical page views of binding system 30D. By rotating the image on map 30D, the main pages provide the rows and the columns now are defined by the secondary pages. This rotation can provide the needed dimensions for a particular map. For example, while map 30 with its vertical main pages can have nearly an unlimited number of columns, it is limited in the number of rows provided by secondary pages. Map 30D on the other hand has its main pages oriented horizontally and can provide a nearly unlimited number of rows for viewing very tall maps. However, map 30D is limited in the number of columns it can display in each row since map 30D can only have a limited number of vertical secondary pages. For this particular example, rotating map 30 ninety degrees counter clockwise provides essentially the same page relationship as map 30 (see page relationship in FIG. 1A). While the layout of the pages in relationship to each other is the same, their physical position and orientation relative to the map structure is different. For example, page image 41 in map 30D is located on half of sheet 28a and the underside of sheet 26b, in map 30 page image is on main sheets 22a and 24a. In fact, all the page images for map 30d have shifted their location on the sheets except page image 44 which is the center image around which the map image was rotated for placement on map 30 reoriented structure as seen in map 30D.

Fifth Alternative Binding System Construction—FIG. 5B

The remaining three examples (FIGS. 5B, 5C, and 5D) are presented here to demonstrate how secondary pages constructed between main pages can provide the required number of secondary pages for the needed page/image relationship. As shown in maps 30 and 30D, main pages 22a, 24a, 26a and 28a, and secondary pages 24b, 26b and 26c, can each be oriented either vertically or horizontally depending on the needed map. Nearly any number of secondary pages can be added as long as they can be folded along the main page spine of the map.

In FIG. 5B, we see map structure 30E, showing how secondary sheets 64a and 64b can be bonded along a spine 73f (equivalent to bond zone 23 in FIG. 5A). Sheets 64a and 64b can be made out of any printable sheet material, such as, paper, polymer, etc. Sheets 64a and 64b are folded perpendicular to spine 73g of main page sections 37a and 37c, with sheet 64b folded inside sheet 64a. Sheets 64a and 64b can be bonded together before bonding to map sections 37a and 37c along spine 73f. Sheet 64a is bonded to the map along spine 73f on map sections 37a and 37c. Sheet 64b is bonded on top of sheet 64a along spine 73f but inside the folded sheet 64a, so that each sheet provides two secondary pages (each page with two sides). This provides four independent secondary pages between the main page sections 37a and 37c and to provide five separate page images. Sheets 64a-b are made of sufficiently thin sheet material to allow not only each of the secondary pages of sheets 64a-b to fold along spine 73f (bond line), but also to allow map sections 37a and 37b to fold together at their intersection 73g. This requires sheets 64a-b to be folded twice, once along spine 73f and then again along spine 73g, at the same time. Only two sheets 64a and 64b are shown here, but many more similar sheets can be used, especially if the user returns these secondary pages to approximately their middle page before folding map sections 37a and 37c closed. Twenty or more secondary sheets (forty secondary page-forty-one separate page images) can be used, however, more than this can cause significant folding problems. These folding problems can be partially resolved by making the sheets more flexible and able to fold better. For example, sheet 64b could be cut along fold lines 73h and the gap between these lines replaced with a thin more flexible polymer film. In this way sheet 64b could be folded along spine 73f and along fold lines 73h more easily. Sheets 64a-b can also include a center notch (at the intersection of the main and secondary spines), similar to notch 79 seen in FIG. 3B, to allow the sheets to be more easily folded twice.

Sixth Alternative Binding System Construction—FIG. 5C

In FIG. 5C we see map structure 30F, showing how full secondary pages 65a and 65b can be folded and attached to main pages 24a and 26a (top page on map sections 37a and 37b, respectively, see FIGS. 1 and 3A) of the disclosed map construction. In this example, instead of placing pages 65a and 65b one inside the other like pages 64a and 64b, pages 65a-b are placed side by side. Pages 65a and 65b are bonded along adjacent spines 73a and 73b, respectively. Spines 73a and 73b can be substantially a single spine such as binding in a standard pocket book, or separate spines where each sheet is attached separately at an offset position from the other. Offsetting the spines, as shown, allows the double fold corner of each sheet to be located at slightly different locations on the main spine 73g so that sheets 65a-b can be folded along spine 73g more easily.

Seventh Alternative Binding System Construction—FIG. 5D

In FIG. 5D we see map structure 30G, showing how multiple secondary sheets 65a, 65b, 65c, and secondary half-sheets 65d and 65e, might be attached to main map sections 37a and 37b. As in map structure 30F in FIG. 5C, pages 65a, and 65b are bonded along their fold lines at separate parallel secondary spines 73a, and 73b, respectively. Similarly, secondary sheet 65c is bonded adjacent sheet 65a along secondary spine 73c. Many additional secondary sheets can be added this way if desired. Offsetting the spines, as shown, allows the double fold corner of each sheet to be located at slightly different locations on the main spine 73g while still substantially bisecting main spine 73g. This spacing of sheets 65a-b allows them to more easily folded along spine 73g (sections 37a and 37c folded together). However, while each sheet 65a-c are taught having their own secondary spine 73a-c, respectively, in practice these pages can be much more closely spaced than shown in FIGS. 5C and 5D, and can substantially comprise only a single spine structurally (spines 73a-c combined together into a single spine 73a-c). In addition, half pages may be added [if desired], if desired, such as, secondary half sheets 65d and 65e. Half-sheets 65d and 65e are bonded to sections 37a and 37c along secondary spines 73d and 73e, respectively. Secondary spines 73a-e substantially bisect main page sections 37a and 37c, while at the same time main spine 73g substantially bisects secondary spines 73a-e. Because of this structure, as with the other examples discussed in this patent, secondary sheets must be able to fold [both] along both their secondary spine as well as the maps main spine. For example, in FIG. 5D, sheets 65a-e must be able to fold along secondary spines 73a-e, while at the same time, when laid flat against sections 37a and [37a] *37c*, must fold along main spine 73g (cross fold) so that map 30G can be folded closed. To achieve this ability to cross fold, sheets 65a-e can be made of flexible printable materials, such as paper, polymer sheets, etc. and notches similar to expansion notch 79 can be cut out of the sheets at the center of the cross fold (at the intersection of the main spine 73g and the secondary spine) to reduce binding of the printable material at that double folded area.

FIG. 6A, binding system 30 is opened to its first row and first column page view. Page image 41 from large format map image 40 is printed on this page view surface. Overlap [boarder] *border* images 51 and 52, and map guide 40a are also shown in this page view.

FIG. 6B, binding system 30 is opened to its first row and second column page view. Page image 42 from large format map image 40 is printed on this page view surface. Overlap [boarder] *border* images 51, 52, 53, 54 and 55, and map guide 40b are also shown in this page view.

FIG. 7A, binding system 30 is opened to its first row and third column page view. Page image 43 from large format map image 40 is printed on this page view surface. Overlap [boarder] *border* images 54, 55 and 56, and map guide 40c are also shown in this page view.

FIG. 7B, binding system 30 is opened to its second row and second column page view. Page image 44 from large format map image 40 is printed on this page view surface. Overlap [boarder] *border* images 52, 53, 55 and 57, and map guide 40d are also shown in this page view.

FIG. 8A, binding system 30 is opened to its second row and third column page view. Page image 45 from large format map image 40 is printed on this page view surface. Overlap [boarder] *border* images 55, 56, 57, 58 and 59, and map guide 40e are also shown in this page view.

FIG. 8B, binding system 30 is opened to its third row and third column page view. Page image 46 from large format map image 40 is printed on this page view surface. Overlap [boarder] *border* images 58, and 59, and map guide 40f are also shown in this page view.

Eighth Alternative Binding System Construction—FIGS. 9A and 9B

In FIG. 9A we see map structure 30H (binding system), showing the minimum structure needed to still provide the Applicant's invention. Map 30H comprises three bonded paper sheets 61, 64 and 65, and a cloth spine strip 38 bonding them together to form a main spine 21. Sheet 61 is a half sheet in this example and forms main page 80a. Sheet 65 is a full sheet with its left side forming main sheet 80b and its right side forming main page 80c. Sheet 64 is a half sheet placed horizontally across the middle of sheet 65 and bonded at secondary spine 23a to form secondary page 86a. Secondary spine 23a substantially bisects sheet 65 and main pages 80b and 80c, and secondary page 86a is foldable along both secondary spine 23a and main spine 21 at the same time. When secondary page 86a is turned down or up along spine 23a, page view 82 (first row showing) or 84 (second row showing) are presented, respectively. When main page 80b is turned to the right (first column showing), page view 81 is presented. When main page 80b is turned to the left (second column showing), page view 82 or 84 is presented depending on the position of secondary page 86a. Thus, this design provides two columns and two rows of page views to disclose the map of Florida in three map page images 91, 92, and 94 as shown in FIG. 9B. An additional printable page(s) can be added to provide nearly any number of rows, columns, and page views.

In FIG. 9A, [overlap sections 87 are] *an overlap section 87 can be* provided on both sides of combined sheets 65 and 64 for the printing of overlap image 97 (*FIG. 9B*). [Overlap sections 88 are] *An overlap section 88 can be* provided on both sides of the bottom edge of secondary sheet 64 for the printing of overlap image 98 (*FIG. 9B*). [And] *An overlap section 89 can be printed with a* corner overlap image 99 [is] (*FIG. 9B*) printed on both sides of secondary sheet 64 and the back side of page 80b (left side of sheet 65). All three overlap images 99 are in the same corner of the sheets *64 and 65* when positioned as shown in FIG. 9A. These overlap images provide continuity between page images to help the user identify their location when turning pages of the map. Overlap image 97 is printed along with both map page images 91 and 92. And overlap [image] *section* 88 is printed with both page images 92 and 93. Overlap images 97, 98, and 99, seen in FIG. 9B, are printed on overlap sections 87, 88, and 89 seen in FIG. 9A, respectively. Map *page* images 91, 92, and 94, seen in FIG. 9B, are printed on page views 81, 82, and 84, respectively, along with the appropriate overlap images [87, 88 and 89] *97, 98 and 99* (see FIG. [9A] *9B*). Page view 81 would contain overlap images [87 and 89] *97 and 99* along its right edge. Page view 82 would contain overlap images [87 and 89] *97 and 99* along its left edge and overlap images [89 and 88] *99 and 98* along its bottom edge. Page view [83] *84* would contain overlap images [89 and 88] *99 and 98* along its top edge. Thus, when main page 80b is turned to the right, overlap image 97 is shown on the right-most edge of page view 81 (back side edge of page 80b as seen in FIG. 9A). When main page 80b is turned to the left, overlap image 97 is shown on the left side of page view 82 (marked as strip 87). Overlap [image 98 is] *images 99 and 98 are* printed on both sides of secondary page 86a along its outer edge [and the bottom right corner of page view 81 (bottom corner of page 80b)]. Thus, when page 86a is turned up, overlap [image] *images* 99 and 98 are shown along the top of page view 84 (overlap image 99 in the upper left corner). This structure and inclusion of overlapped images allow the user to easily follow a path on the map from one page image to the next, intuitively turning the pages in the direction they wish to view, both horizontally and vertically.

In FIG. 9B, the dashed lines represent how prior art would section a map into three separate page images. The Applicant's map would include overlap images 97, 98 and 99 as marked by solid line boxes for multiple pages to allow the user to more easily read the map when turning from one page to the next. The solid lines are slightly misaligned to [all] *allow* the reader to distinguish the edges of separate full page image (main map page image and overlap image). In an actual map, the page image sides would be substantially aligned, both vertically and horizontally. Overlap image 97 appears in both page view [81] *91* and page view [82] *92*. Overlap image 98 appears in both page view [82 an] *92 and* page view [84] *94*. Corner overlap image 99, appears in all three page views [81, 82, and 84] *91, 92, and 94*.

Ninth and Tenth Alternative Binding System Construction—FIG. 10A

In FIG. 10A, we see a ninth and tenth alternative example book structure binding systems 30I and 30J (binding systems) in the same drawing. Both book structures are similar to the structure seen in FIG. 4B where longitudinal sheets are used to form the book structure. Both of these book structures design can be made on a continuous roll printing and binding system. In FIG. 10A, book binding system 30I is shown on the left side of center fold 71d, and book binding system 30J is shown on the right side of center fold 71d. On the left-side sheets 70, 72 and 102 are stacked one atop the other for bonding near their center lines (bonding line 75a) similar to book structure 30C seen in FIG. 4B. On the right side two folded sheets 103a and 103b are laid next to one another with their folded edges bonded to sheet 72 at bonding line 75b. Both book binding systems 30I and 30J use the same main page sheet 70 seen in FIG. 4B, and sheet 70 is folded the same as it was in FIG. 4B. These two constructions are combined in this drawing to conserve space, and in an actual binding system only one construction would be used through the binding system, where each half would mirror itself across center fold line 71d. Book cover 38a provides an outer book cover for both book structures 30I or 30J and provides a bonding surface for bonding inner folded edges 71b, 71d, and 71f onto the center of book cover 38a. In alternative designs, the still exposed back portions of sheet [72] *70* can be bonded to book cover 38a so that those portions of sheet [72] *70* become part of book cover 38a.

In FIG. 10A, on the left-side we see book structure binding system 30I, where sheets 70 and 72 are substantially the same as they were in FIG. 4B, with added sheet 102 placed and aligned on top of sheet 72. Sheets 70, 72 and 102 are bonded together near their center line along bonding line 75a. Added sheet 102 provides two more secondary page sheets across all columns of binding system 301. On sheet 72, perforated lines 72a-b provide tear lines for strips 74a-b to be easily removed after construction. Similar strips with perforated lines can be located near folded edge 71e, but are not in this drawing to keep the drawing less cluttered. On sheet 102, perforated lines 102a-b provide tear lines for strip 104b, so that it can be easily removed after construction (a similar perforated strip above strip 74a has been removed and is not shown in FIG. 10A). Similar perforated strips on sheet 102 can exist at folded edge 71e, but have been removed and are not shown FIG. 10A to keep the drawing uncluttered. The use of two secondary sheets 72 and 102 provide four secondary pages, and when combined with sheet 70 create five separate page views in each column.

In FIG. 10A, on the right-side we see book structure binding system 30J, where sheet 70 is substantially the same as it was in FIG. 4B, and added folded secondary sheets 103a and 103b are placed and aligned on top of sheet 70. The folded edge of sheets 103a and 103b are bonded together near the center line of sheet 70 at bonding line 75b. Secondary sheets 103a and 103b can each provide two secondary pages, for a total of four secondary page sheets in each columns of the book structure (binding system 30J). On sheet 103a, perforated edges 105a-b provide tear lines for removing a narrow strip (not shown in drawing) from sheet 103a. Similarly, sheet 103b, has perforated edges 105c-d to provide tear lines for removing a narrow strip (not shown in drawing) from sheet 103b. Similar strips with perforated lines can be located near folded edge 71c, but are not in this drawing because a different binding system structure 30I is shown on the left-side of FIG. 10A. Perforated strips similar to strips 74b and 104b can exist at folded edge 71e, but are not shown here because of the alternate binding system shown on the left-side of FIG. 10A. The use of two secondary sheets 103a-b provide four secondary pages, and when combined with sheet 70 create five separate page views in each column.

Eleventh Alternative Binding System Construction—FIG. 10B

In FIG. 10B, we see a book structure 30K which is substantially the same as book structure binding system 30I (binding system) on the left half of FIG. 10A, except for the extended length of sheets 70, 72, and 102 which adds an additional main page and an additional page view column. As before, sheets 70, 72, and 102 are stacked and aligned on top of each other and bonded together near their center line along bonding line 75a. Because of this extending of sheets 70, 72, and 102 edge 71g no longer is the edge of sheet 70, but extends to create an outward folded edge 71g. Edge 71g in FIGS. 4B and 10A, and fold folded 71g in FIG. 10B are labeled with the same number since both are physically at the same location on sheet 70 and both can act as a main page. Thus the extra length of sheets 70, 72, and 102 provide an additional inner fold 71f and a new right edge 71g. This forms five main pages when bonded to outer cover 38a with the cover acting as the first and fifth main page. This provides four viewable columns with each viewable column provide five viewable rows from four secondary pages. The result is book structure 30K has a page view structure that has five rows and four columns to provide twenty separate page views. By adding additional length to sheets 70, 72, and 102, more main pages can be added to increase the number of viewable columns in book structure 30K. By adding additional secondary sheets, like sheets 72 and 102, more secondary pages can be added to increase the number of viewable rows in book structure 30K. Thus, by changing the sheet lengths, and changing the number of secondary sheets used, nearly any number of rows and columns can be created for a particular book binding system.

Operational Description (FIGS. 1, Through 3A, 6A-B, 7A-B, and 8A-B)

Operation of the disclosed large format binding system is explained here by showing the operation of map 30 discussed in FIGS. 1 through 3A. Map 30 has six page images 41 through 46 as seen in FIGS. 1A and 2A through 2J. The structure of map 30 may comprise the structures similar to maps structures seen in FIGS. 3A, 4A, and/or 5A. The map structures seen in FIGS. 3B, 4B, and 5B through 5D can also be used to hold the image of map 40, but extra page [images] *image* spaces will exist in the map that are not used by map 40 as shown. The operation of alternative configurations can be easily understood from the discussion of the following examples.

Map 30 seen in FIGS. 1 and 3A, comprises the map image 40 as seen in FIGS. 1A, and 2A through 2J. Map 30 can be opened to six page unique views seen in FIGS. 6A, 6B, 7A, 7B, 8A, and 8B which have page images 41 through 46, respectively printed on their surface. These six page images are positioned within the disclosed map structure so that turning one main page from right to left results in moving the viewed page image one page image to the East. Turning one main page from left to right moves the viewed page image one page image to the West. Turning one secondary page from top to bottom, moves the viewed image one page image to the North. Turning one secondary page from bottom to top, moves the viewed image one page image to the South. With this arrangement the user can intuitively turn pages in the direction they wish to view the map, left to move left, right to move right, up to move up, and down to move down.

Now lets walk through one sequence of page turns to help understand how map 30 operates. Starting from the image seen in FIG. 1, the user can grab tab 47 labeled "Column 1" and open page 22a to the left while leaving the remaining pages to the right. In this open position, page image 41 (western section of the Florida Panhandle) can be seen by the user (as seen in FIG. 6A). Map guide 40a identifies this page image's location within the overall map by shading (or coloring) that portion of guide 40a that represents page image 41.

For this particular map, page image 41 is the only image page in the first column (farthest left column). Thus, the only direction that pages can be turned from the position in FIG. 6A is from right to left. If a user were using this map and traveling across Florida, when they neared the East edge of page image 41 they enter overlap border image 51 (or possibly overlap corner image 52). This overlap border image 51 is shown on the right edge of page images 41 and the left edge of page image 42. If the user now turns page 24a by grabbing tab 48 ("Column 2" tab) and turning the page to the left, a copy of overlap image 51 is now shown on lift side of page image 42 (see FIG. 6B) and the user can continue their travels Eastward along the map West to East. This means that the edge of page 24a that is opposite main spine axis 21 is printed on both sides with substantially the same image of overlap image 51. Page image 42 also comprises guide map 40b to show what portion of the Florida map the user is viewing. Notice that guide map 40b has a page image 44 below their present page image and also a page image 43 to the right. Both of these page images (43 and 44) are available to the user by simply turning the page that is resting in that direction. For example, if the user wanted to continue Eastward toward the Florida East coast, they would simply turn page 26a (Column 3 tab) from right to left to show page image 43 as seen in FIG. 7A. Notice that the East most overlap border image 54 in page image 42 (FIG. 6B) is now shown at the West most edge of page image 43 in FIG. 7A. Thus, the user can now quickly identify their location in FIG. 7A (page image 43) by simply identifying landmarks that they are near in the overlap border image 54.

The value of these overlap cannot be overstated. Without map overlap images on the page images, it is easy for the user to get confused about where they are on the map, especially near corners of converging page images. For example, overlap corner image 55 appears in four page images 42, 43, 44, and 45. If these page images did not overlap to create this overlap corner image 55, traveling near this corner would be confusing as one may have to turn to many page images in just a short distance of travel. For example, if a traveler were driving from Gainesville, Fla. to Tampa, Fla. they may have to travel through the overlap image 55. If overlap image 55 was not shown in each of the four page images (42, 43, 44 and 45), as it is in the disclosed invention, then the user who is traveling within page image 42 may have to switch to page image 43 as they drive slightly Eastward, then switch to page image 45 as they go a little further South, and then need to switch to page image 44 as they finally head toward Tampa to the West. This could become quite confusing for the user to determine exactly which page image they need to be viewing without the overlap images 55. However, with overlap image 55 in each of the four page images 42, 43, 44 and 45, this switching between page images is not needed. The entire overlap image 55 can be shown in each of the four page images 42, 43, 44, and 45, so the user who is traveling through this area will not have to switch to the next page image on the map until they are about to travel out of overlap image 55. Then the user can turn to a new page view printed with the same overlap image 55 that gives the user a visual reference point to locate their position on the new page image. These overlap images also give the user room to backtrack a significant distance on the map without having to switch to a different page again. Thus, the user can easily identify where they are on the new page image as they turn from one page image to another.

Going back to our discussion of the user having map 30 open to page image 42 (see FIG. 6B). If the user decides not to go to the East coast (FIG. 7A), as discussed above, but decides to travel south along the Gulf Coast. If this is the case, then the user travels into overlap [boarder] *border* image 53 of page image 42 (FIG. 6B) of the map. The user then simply turn secondary page 24b from bottom to top to reveal page image 44 (see FIG. 7B). By turning page 24b upward, page image 44 is displayed as seen in FIG. 7B. Notice that overlap images 53 and 55 which were at the bottom of page image 42 now has a copy of the same overlap images 53 and 55 at the top of page image 44 (FIG. 7B). This means that image of overlap images 53 and 55 are printed on both sides of the outer edge of secondary page 24b. Map guide 40d identifies the section of the main map that the user is presently viewing (page image 44) by shading that area. In color versions these guide maps may use a different tint, color or hue to identify the presently viewed area. Notice that from page image 44 (FIG. 7B), the user can move Northward by turning secondary page 24b downward, or Eastward by turning main page 26a to the left. No other map gives you this ability in a book format. On larger maps with more page images, i.e. a three by three page image map (nine page images total, see FIGS. 3B and 4B), the center page image would have four different page images one can turn to. Turning the page on the left would show the page image to the West, turning the page on the right would show the page image to the East, turning the page on the top would show the page image to the North, and turning the page on the bottom would show the page image to the South.

From page image 44 the user can turn back to page image 42 above it or to page image 43 by turning page 26a on its right. Notice that when viewing the map as seen in FIG. 7B, one cannot go directly to page image 45 with the pages set up they way they are shown in FIG. 7B. Instead, the user must first turn page 26a to the left to obtain the view seen in FIG. 7A and then turn page 26b upward to show page image 45, which is shown in FIG. 8A. Page image 45 is directly East of page image 44, and now with page 26b flipped upward the user can turn back and forth between page images 44 and 45 simply by turning page 26a right and left, respectively (note that in FIG. 8A shows secondary page 24b folded down behind main page 26a, not up, as we are discussing here). From this position with page image 45 showing, the user can view page images in the North, West and South directions simply by turning one page from the Top, Left and Bottom edges of the map, respectively. For example, to view page image 43 (FIG. 7A) to the North, the user simply turns page 26b form the top to the bottom of the map to reveal page image 43. Similarly, if the user wishes to view page image 44 (FIG. 7B) to the West, the user simply turns page 26a from the left to the right. And finally, if the user wishes to look at page image 46 (see FIG. 8B) to the South, the user simply turns page 26c from the bottom to the top. In each case, overlap images at the edges of each page image allows the user to easily follow their location on the map as they turn the pages.

Alternatively, the user may take other paths across Florida. In each case, the user can simply turn to the needed map page image by turning the page that is in the direction they want to go. For example, if the user wanted to enter Florida near Pensacola and travel across the Northern portion of Florida to Jacksonville and then go down the East coast to Miami, they would start out as before, by lifting "Column 1" tab 47 and turning it from right to left. This reveals page image 41 (FIG. 6A). As the user's travel nears the East edge of page image 41 in overlap border image 51 (or overlap border image 52 if on an alternate path), the user would turn main page 24a by lifting "Column 2" tab 48. This reveals page image 42 (FIG. 6B) if folded as shown in FIG. 6A. If secondary page 24b happens to be folded up, then page image 44 (FIG. 7B) will be shown and the user would need to flip secondary page 24b down to show the correct page image 42. The user can quickly find their present location on the map because their position has the same vertical placement on the page image 42 as it did on page image 41, and overlap section 51 can be clearly marked on both page images 41 and 42 so the user knows where to look for towns, cities and landmarks they where near on page image 41 before turning to page image 42.

The user can now continue traveling East, following the map image on page image 42 (FIG. 6B). As the user nears Jacksonville and enters overlap section 54, the user can take note of what town or landmark they are near, and what road they are on, and turn main page 26a with "Column 3" tab 49 from right to left. If the secondary pages in column three are all folded down as shown in FIG. 6B, then page image 43 (FIG. 7A) is revealed, which contains a map image of Jacksonville Fla. If from Jacksonville, the user now travels South heading toward Orlando through Gainesville Fla. they may need to temporarily turn main page 26a back to the right to view Gainesville fully as shown on page image 42. However, on page image 43 as they pass Gainesville, and near Orlando, they will come to overlap [boarder] *border* image 56 at the bottom edge of page image 43 (FIG. 7A). At this point, the user turns secondary page 26b from bottom to top, to reveal page image 45 (FIG. 8A). As they continue Southward pass Orlando, they eventually reach the South edge of page image 45. The user then turns secondary page 26c from bottom to top to reveal page image 46 (FIG. 8B) which contains a map image of Miami and the Florida Keys. The user can then simply flip the pages in reverse as they travel back up the East coast and then back across the North section of Florida for their return trip. The entire process is very ergonomic because the user simply turns the page in the direction they want to view, irrespective of whether it is North, South, East or West.

From the preceding discussion of the operation of map 30, it is easy to see that turning a vertical page with a vertical spine from left to right moves the page image viewed one column to the left (to the West). Turning a vertical page with a vertical spine from right to left, moves the page image viewed one column to the right (to the East). Turning a horizontal page with a horizontal spine from top to bottom, moves the page image viewed one row upward (to the North). And turning a page with a horizontal spine from bottom to top, moves the page image viewed one row downward (to the South). Thus the user can easily turn to any section of a map, even if the map is vary large and has many columns and rows, by simply turning the pages in the direction they want to go, and following the guide maps as they go to direct them to the desired location. The reader should note that the above mentioned vertical pages and horizontal pages can be either main pages or secondary pages, as desired. Examples of maps with vertical main pages and horizontal secondary pages are shown in FIGS. 1, 3A-4B, and 6A-9A. Examples, of horizontal main pages and vertical secondary pages are shown in FIGS. 5A through 5D. The other example binding systems disclosed in this patent can have images placed on them to operate in substantially the same way as map 30. Larger numbers of main pages and/or larger number(s) of secondary pages does not substantially change the way the user turns from one image to another, but as a large format binding system gets larger, the map locator becomes more and more important for the user to easily navigate a larger map and find where they are on the map.

RAMIFICATIONS, AND SCOPE

Although the above description of the invention contains many specifications, these should not be viewed as limiting the scope of the invention. Instead, the above description should be considered illustrations of some of the presently preferred embodiments of this invention. For example, while only single tab system for the invention is disclosed, many other alternative tab layouts can be used where tabs 47, 48, and 49 could be placed along the top or bottom edge of map 30 instead of the right side to help find the main pages (i.e. main pages 22a, 24a, 26a and 28a in FIGS. 1 and 3A). Also, secondary page tabs could also be used to help the user find the correct secondary page (i.e. secondary pages 24b, 26b and 26c in FIGS. 1 and 3A). Similarly, there are many methods of marking the areas of overlap (i.e. overlap [boarder] *border* images 51 through 59 in FIG. 2) between page images, such as, brightening or dulling the colors in the overlap images, changing the color of the background in the overlap images, making lines thicker in the overlap image, changing the background to gray in the overlap images, etc. Also, many combinations of vertical and horizontal pages are possible and only a few are shown in this document. The reader should realize that the number of secondary pages between any given two main pages is selectable depending on the desired size and shape of the large format image. The disclosed binding method allows essentially an unlimited number of main pages (externally bound pages), and the number of secondary pages bound between these main pages limited only by the ability of the sheet material to fold along the main pages fold line. Thus, the scope of this invention should not be limited to the above examples, but should be determined from the following claims:

I claim:

1. A binding system for printed material, comprising:

a) a main spine with at least three main pages of printable material bound at one edge to the main spine[, wherein] *to allow* the [main spine allows the binding system] *at least three main pages* to open and close [the main pages like a standard book and/or magazine];

b) one or more secondary spines *extending across two adjacent main pages and substantially perpendicular to the main spine,* each [with] *secondary spine being foldable at the main spine and having* one or more secondary sheets of printable material bound [at one edge] to *one of* the *one or more* secondary [spine(s);] *spines,* wherein each secondary sheet comprises one or more secondary pages *and each secondary page can be opened in alignment with a respective secondary spine and the main spine*;

c) [wherein the one or more secondary spines are each defined across two adjacent main pages and substantially perpendicular to the main spine;] wherein each of the one or more secondary spines comprises a bonding [area that is] *zone* defined on [the] surfaces of its respective two adjacent main pages, wherein each bonding [area] *zone* binds [a single edge of each] *a corresponding* secondary sheet to its respective secondary spine; [wherein each secondary page can be opened in either direction around its respective secondary spine when the binding system is open to the two adjacent main pages where that respective secondary spine is defined, and]

[d) wherein the one or more secondary spines are each foldable at the main spine;]

[e)] *d)* wherein the *at least three* main pages and *the one or more* secondary pages form a multiplicity of unique page views [within the binding system, wherein] *and* a large format image is printed across the multiplicity of unique page views, and further including one or more overlap [boarder] *boarder* images printed on [the] *a* periphery of two or more *page images of the multiplicity of* unique page views;

[f)] *e)* wherein [the] *each* overlap [boarder images] *border image* on a particular page view of the multiplicity of unique page views [define] *provides one or* both *of* east [and/or] *and* west [boarder] *overlap border* images [and] *or one or both of* north [and/or] *and* south overlap [boarder] *border* images, wherein:

i) an overlap [boarder] *border* image on [the] *a* right edge of the particular page view [appears again] *is duplicated* on [the] *a* left edge of an adjacent page view when [the] *a* page on [the] *a* right side of the particular page view is turned from right to left, ii) an overlap [boarder] *border* image on [the] *a* left edge of the particular page view [appears again] *is duplicated* on [the] *a* right edge of an adjacent page view when [the] *a* page on [the] *a* left side of the particular page view is turned from left to right, iii) an overlap [boarder] *border* image on [the] *a* top edge of the particular page view [appears again] *is duplicated* on [the] *a* bottom edge of an adjacent page view when [the] *a* page on [the] *a* top of the particular page view is turned from top to bottom, and/or iv) an overlap [boarder] *border* image on [the] *a* bottom edge of the particular page view [appears again] *is duplicated* on [the] *a* top edge of an adjacent page view when [the] *a* page on [the] *a* bottom of the particular page view is turned from bottom to top,

[g)] *f)* wherein at least one of the *one or more* overlap border images [and its duplicate overlap border image are] *provides an overlap corner image* printed on at least [four] *two* different printable surfaces of the [physical sheets of printable material, wherein the physical sheets of printable material comprises main pages and/or secondary pages,] *one or more secondary sheets; and*

[h)] *g)* wherein each unique page [image comprises] *view includes* a printed map guide for [displaying to a user the] *identifying a* location of the *unique* page [image in the main map image] *view relative to the large format image*, and

[i)] wherein the printed map guide [graphically] identifies [for the user] what *unique* page [image] *view* is located in [the] left, right, up or down directions from [the] *a* present *unique* page [image] *view* when turning [the] left, right, top or bottom pages, respectively.

2. The binding system in claim 1, wherein at least one of *the one or more* secondary [page and/or] *pages and the at least three* main pages comprises a single sheet of printable material that is printed on both sides.

3. The binding system in claim 1, wherein the main spine and the *one or more* secondary spines substantially bisect each other at [their] *respective* midpoints, whereby pages can be turned both vertically and horizontally without [significantly] altering [the binding system's] overall dimensions *of the binding system* when open.

4. The binding system in claim 1, wherein [a] *the* large format image is divided into a multiplicity of page images that form a grid of rows and columns, wherein each page image is printed on one unique page view of the multiplicity of unique page views, wherein turning one of the *at least three* main [page] *pages* from left to right changes a [user's] *given* page image one column to the left in the large format image, wherein turning one of the *at least three* main pages from right to left changes the [user's] *given* page image one column to the right, wherein turning one of the *one or more* secondary pages from top to bottom changes the [user's] *given* page image up one row in the large format image, and wherein turning one of the *one or more* secondary page from bottom to top changes the [user's] *given* page image down one row in the large format image, whereby [the] *a* user can turn [pages] *the given page* both horizontally and vertically to view adjacent page images in the large format image [that are in that direction] *in respective directions* on the grid of rows and columns.

5. The binding system in claim 4, further includes an overlap [boarder] *border* image positioned on at least one [boarder] *border* of each page view, wherein adjacent page views have common overlap [boarder] *border* images[, whereby the user can identify a printed object in the overlap border image near an edge of one page view and then turn that page edge and see the printed object in a substantially similar overlap border image on that adjacent page view].

6. The binding system in claim 1, further includes an overlap [boarder] *border* image positioned on at least one [boarder] *border* of each page view, wherein adjacent page views have common overlap border images[, whereby the user can identify a printed object in the overlap border image near an edge of one page view and then turn that page edge and see the printed object in a substantially similar overlap border image on that adjacent page view].

7. The binding system in claim 6, wherein at least one portion of a particular overlap border image is printed on three [adjacent] *unique* page views.

8. The binding system in claim 6, wherein [at least one portion of] a particular overlap [border] *corner* image is printed on four [adjacent] *unique* page views.

9. The binding system in claim 1, wherein the large format image is divided into a plurality of page images that form a grid of rows and columns, [wherein] *and* each page image is printed on one unique page view of the [binding system] *multiplicity of unique page views*, [wherein each unique page image comprises a printed map guide for displaying to the user the present page image's relative location in the map image, wherein the printed map guide graphically identifies for the user what page image in the right, left, up or down directions from the present page image when turning the left, right, top or bottom pages respectively] *and* wherein one or more tabs are attached to an outer edge of one or more *of the at least three* main pages[,] whereby a user can [easily] select a particular main page to turn to by grabbing a particular tab *of the one or more tabs*.

10. The binding system in claim 1, wherein one or more tabs are attached to an outer edge of one or more *of the at least three* main pages[,] whereby a user can [easily] select a particular main page to turn to by grabbing a particular tab *of the one or more tabs*.

11. The binding system in claim 1, wherein, *when the main spine is opened,* the binding system [has substantially] *exhibits* the same overall dimensions [once the main spine is opened, whereby further] *while* flipping [of] *the at least three* main pages [and/or] *or the one or more* secondary pages [does not substantially change the viewable area of the binding system].

*12. The binding system in claim 1, wherein the main spine is oriented horizontally relative to the large format image.*

*13. The binding system in claim 1, wherein the main spine is oriented vertically relative to the large format image.*

*14. The binding system in claim 1, wherein the large format image is selected from the group consisting of a geographical map, a schematic drawing, a blueprint, and a photograph.*

*15. The binding system in claim 1, wherein the one or more secondary sheets are bound at one edge to the one or more secondary spines.*

*16. The binding system in claim 1, wherein the one or more secondary sheets are bound at one folded edge to the one or more secondary spines.*

*17. The binding system in claim 10, wherein one or more secondary tabs are attached to an outer edge of at least one of the one or more secondary pages whereby the user can select a particular secondary page to turn to by grabbing a particular secondary tab of the one or more secondary tabs.*

*18. The binding system in claim 1, wherein a notch is defined in the one or more secondary pages at an intersection of an associated secondary spine and the main spine, and wherein the one or more secondary pages are configured to expand into the notch upon being cross folded.*

*19. A binding system for printed material, comprising:*

*a) a main spine with at least three main pages of printable material bound at one edge to the main spine to allow the at least three main pages to open and close;*

*b) one or more secondary spines extending across two adjacent main pages and substantially perpendicular to the main spine, each secondary spine being foldable at the main spine and having one or more secondary sheets of printable material bound to one of the one or more secondary spines, wherein each secondary sheet comprises one or more secondary pages and each secondary page can be opened in alignment with a respective secondary spine and the main spine;*

*c) a notch defined in the one or more secondary pages at an intersection of an associated secondary spine and the main spine, wherein a portion of the one or more secondary pages is expandable into the notch upon being cross folded;*

*d) wherein each of the one or more secondary spines comprises a bonding zone defined on surfaces of its respective two adjacent main pages, wherein each bonding zone binds a corresponding secondary sheet to its respective secondary spine;*

*e) wherein the at least three main pages and the one or more secondary pages form a multiplicity of unique page views and a large format image is printed across the multiplicity of unique page views, and further including one or more overlap border images printed on a periphery of two or more page images of the multiplicity of unique page views;*

*f) wherein each overlap border image on a particular page view of the multiplicity of unique page views provides one or both of east and west overlap border images or one or both of north and south overlap border images, wherein:*

*i) an overlap border image on a right edge of the particular page view is duplicated on a left edge of an adjacent page view when a page on a right side of the particular page view is turned from right to left,*

*ii) an overlap border image on a left edge of the particular page view is duplicated on a right edge of an adjacent page view when a page on a left side of the particular page view is turned from left to right,*

*iii) an overlap border image on a top edge of the particular page view is duplicated on a bottom edge of an adjacent page view when a page on a top of the particular page view is turned from top to bottom, and/or*

*iv) an overlap border image on a bottom edge of the particular page view is duplicated on a top edge of an adjacent page view when a page on a bottom of the particular page view is turned from bottom to top,*

*g) wherein at least one of the one or more overlap border images provides an overlap corner image printed on at least two different printable surfaces of the one or more secondary sheets; and*

*h) wherein each unique page view includes a printed map guide for identifying a location of the unique page view relative to the large format image, and wherein the printed map guide identifies what unique page view is located in left, right, up or down directions from a present unique page view when turning left, right, top or bottom pages, respectively.*

* * * * *